(12) United States Patent
Nishiyama et al.

(10) Patent No.: US 12,411,546 B2
(45) Date of Patent: Sep. 9, 2025

(54) INFORMATION PROCESSING APPARATUS, INFORMATION PROCESSING METHOD, AND PROGRAM

(71) Applicant: FUJIFILM Corporation, Tokyo (JP)

(72) Inventors: Yukinori Nishiyama, Saitama (JP); Shinya Fujiwara, Saitama (JP); Masaru Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/610,231

(22) Filed: Mar. 19, 2024

(65) Prior Publication Data

US 2024/0220013 A1 Jul. 4, 2024

Related U.S. Application Data

(63) Continuation of application No. PCT/JP2022/019585, filed on May 6, 2022.

(30) Foreign Application Priority Data

Sep. 30, 2021 (JP) ................................ 2021-161793

(51) Int. Cl.
*G06F 3/01* (2006.01)
(52) U.S. Cl.
CPC .................... *G06F 3/013* (2013.01)
(58) Field of Classification Search
CPC .............................................. G06F 3/011–013
See application file for complete search history.

(56) References Cited

U.S. PATENT DOCUMENTS

| | | | |
|---|---|---|---|
| 11,513,590 B2* | 11/2022 | Ronkainen | G02B 27/0093 |
| 11,908,055 B2* | 2/2024 | Saito | G06F 3/011 |
| 11,983,319 B2* | 5/2024 | Takagi | G06V 40/193 |
| 12,056,417 B2* | 8/2024 | Kawamae | G06T 7/70 |
| 2015/0364140 A1 | 12/2015 | Thörn | |
| 2017/0270383 A1 | 9/2017 | Onomura | |
| 2019/0057694 A1 | 2/2019 | Biswas | |

(Continued)

FOREIGN PATENT DOCUMENTS

| | | |
|---|---|---|
| JP | H07199046 | 8/1995 |
| JP | 2000075198 | 3/2000 |

(Continued)

OTHER PUBLICATIONS

"International Search Report (Form PCT/ISA/210) of PCT/JP2022/019585", mailed on Jun. 28, 2022, with English translation thereof, pp. 1-9.

(Continued)

*Primary Examiner* — Patrick F Marinelli
(74) *Attorney, Agent, or Firm* — JCIPRNET

(57) ABSTRACT

An information processing apparatus is an information processing apparatus including a processor, the processor is configured to acquire first image data, output the first image data to a display, acquire visual line data, detect, as a gaze position, a visual line position of a case where a state where a variation distance of the visual line position with respect to a first image indicated by the first image data is equal to or shorter than a first distance continues for a first time or longer based on the visual line data, and set a first region based on two or more gaze positions.

10 Claims, 31 Drawing Sheets

(56) References Cited

U.S. PATENT DOCUMENTS

| | | |
|---|---|---|
| 2019/0285881 A1 | 9/2019 | Ilic et al. |
| 2019/0384385 A1 | 12/2019 | Idris et al. |
| 2020/0363635 A1 | 11/2020 | Ilic et al. |
| 2021/0051266 A1 | 2/2021 | Matsuo |
| 2021/0203856 A1 | 7/2021 | Hirose et al. |
| 2021/0240260 A1* | 8/2021 | Ronkainen .............. G06F 3/017 |
| 2021/0289126 A1 | 9/2021 | Ishii |
| 2022/0180583 A1* | 6/2022 | Saito ....................... G10L 15/22 |
| 2022/0244532 A1 | 8/2022 | Ilic et al. |
| 2023/0236666 A1* | 7/2023 | Takagi ................. G06V 40/193 |
| | | 345/156 |
| 2023/0367536 A1* | 11/2023 | Kawamae ........... G06F 3/04886 |
| 2024/0220013 A1* | 7/2024 | Nishiyama ............... G02B 7/28 |
| 2024/0354048 A1* | 10/2024 | Kawamae ............... G06F 3/012 |

FOREIGN PATENT DOCUMENTS

| | | |
|---|---|---|
| JP | 2017169167 | 9/2017 |
| JP | 2018084875 | 5/2018 |
| JP | 2021012229 | 2/2021 |
| JP | 2021018315 | 2/2021 |
| JP | 2021034756 | 3/2021 |
| JP | 2021105694 | 7/2021 |
| JP | 2021517689 | 7/2021 |
| JP | 2021145191 | 9/2021 |

OTHER PUBLICATIONS

"Written Opinion of the International Searching Authority (Form PCT/ISA/237) of PCT/JP2022/019585", mailed on Jun. 28, 2022, with English translation thereof, pp. 1-10.

\* cited by examiner

INFORMATION PROCESSING APPARATUS, INFORMATION PROCESSING METHOD, AND PROGRAM

This application is a continuation application of International Application No. PCT/JP2022/019585, filed May 6, 2022, the disclosure of which is incorporated herein by reference in its entirety. Further, this application claims priority under 35 USC 119 from Japanese Patent Application No. 2021-161793 filed Sep. 30, 2021, the disclosure of which is incorporated by reference herein.

BACKGROUND OF THE INVENTION

1. Field of the Invention

The technology of the present disclosure relates to an information processing apparatus, an information processing method, and a program.

2. Description of the Related Art

JP1995-199046A (JP-H07-199046A) discloses an apparatus with a visual line detection function comprising a visual line detection unit configured to detect a user's visual line, and a controller configured to detect the user's gazing point from output of the visual line detection unit and determine a region for acquiring information for controlling operations of the apparatus from among a plurality of regions in an observation screen, in which the controller is provided with a varying unit that varies movement responsiveness of the region in a case of determining the region depending on a position in which the user's visual line position exists.

JP2021-105694A discloses an imaging apparatus having a first detection unit configured to detect a position of a gazing point in an image based on the user's visual line, a first setting unit configured to set a range for detecting a subject based on the position of the gazing point and a imaging condition, a second detection unit configured to detect a feature region from the image, and the second setting unit configured to set a focus detection region according to a position of the feature region included in the range for detecting the subject.

JP2000-75198A discloses an apparatus with a visual line detection function that has a plurality of information detection regions and a plurality of visual line detection regions including each of the information detection regions in an image, and performs a predetermined operation based on a signal obtained in an information detection region included in a visual line detection region selected by a visual line detection unit from among the plurality of visual line detection regions, the apparatus having a region calculation unit configured to obtain gaze position-valid regions of an operator in an image, calculate a gaze overlapping region in which all of the plurality of gaze position-valid regions overlap each other, and select a region, which is included in a visual line detection region including the gaze overlapping region, as the information detection region in each case where the visual line detection unit performs visual line detection.

SUMMARY OF THE INVENTION

One embodiment according to the technology of the present disclosure provides an information processing apparatus, an information processing method, and a program capable of setting a region on an image based on a visual line position, for example.

A first aspect according to the technology of the present disclosure is an information processing apparatus comprising a processor, in which the processor is configured to acquire first image data, output the first image data to a display, acquire visual line data, detect, as a gaze position, a visual line position of a case where a state where a variation distance of the visual line position with respect to a first image indicated by the first image data is equal to or shorter than a first distance continues for a first time or longer based on the visual line data, and set a first region based on two or more gaze positions.

A second aspect according to the technology of the present disclosure is the information processing apparatus according to the first aspect, in which the processor is configured to set, as the first region, a rectangular region having two gaze positions as opposite corners, a circular region having a line connecting the two gaze positions as a diameter, or a closed region defined by connecting a plurality of gaze positions in an order in which the plurality of gaze positions are detected.

A third aspect according to the technology of the present disclosure is the information processing apparatus according to the first or second aspect, in which the processor is configured to, in a case where three or more gaze positions are detected, set a position at which lines connecting two gaze positions intersect with each other as an intersection position, and set the first region based on the gaze positions and the intersection position.

A fourth aspect according to the technology of the present disclosure is the information processing apparatus according to the third aspect, in which, in a case where the first region having n vertices is set, at least n+1 gaze positions are used.

A fifth aspect according to the technology of the present disclosure is the information processing apparatus according to any one of the first to fourth aspects, in which the processor is configured to output data indicating a visual line position mark that specifies the visual line position in the first image until the first time is reached, and output data indicating a gaze position mark that specifies the gaze position in the first image in a case where the first time is reached.

A sixth aspect of the technology of the present disclosure is the information processing apparatus according to the fifth aspect, in which the visual line position mark changes in form with passage of time.

A seventh aspect according to the technology of the present disclosure is the information processing apparatus according to any one of the first to sixth aspects, in which the processor is configured to set the first region from a plurality of regions included in the first image based on the two or more gaze positions.

An eighth aspect of the technology of the present disclosure is the information processing apparatus according to any one of the first to seventh aspects, in which the information processing apparatus is an imaging apparatus, and the processor is configured to perform, in a case where a target subject is included as an image in the first region, control to bring the target subject in a depth of field.

"A ninth aspect according to the technology of the present disclosure is an information processing apparatus comprising a processor, in which the processor is configured to acquire second image data, output the second image data to a display, acquire visual line data, detect a track along which a visual line position has varied within a second time with respect to a second image indicated by the second image data based on the visual line data, and set a second region based on the track."

A tenth aspect according to the technology of the present disclosure is the information processing apparatus according to the ninth aspect, in which the second region is a region surrounded by the track.

An eleventh aspect according to the technology of the present disclosure is the information processing apparatus according to the ninth aspect, in which the second region is a region surrounding the track.

A twelfth aspect according to the technology of the present disclosure is the information processing apparatus according to any one of the ninth to eleventh aspects, in which the processor is configured to determine whether or not a blink occurs within the second time based on the visual line data, and detect, in a case of determining that the blink occurs, the track based on a line connecting a first visual line position before the occurrence of the blink and a second visual line position after the occurrence of the blink.

A thirteenth aspect according to the technology of the present disclosure is the information processing apparatus according to any one of the ninth to twelfth aspects, in which the processor is configured to set the second region from a plurality of regions included in the second image based on the track.

A fourteenth aspect of the technology of the present disclosure is the information processing apparatus according to any one of the ninth to thirteenth aspects, in which the information processing apparatus is an imaging apparatus, and the processor is configured to perform, in a case where a target subject is included as an image in the second region, control to bring the target subject within a depth of field.

A fifteenth aspect according to the technology of the present disclosure is an information processing method comprising acquiring first image data, outputting the first image data to a display, acquiring visual line data, detecting, as a gaze position, a visual line position of a case where a state where a variation distance of the visual line position with respect to a first image indicated by the first image data is equal to or shorter than a first distance continues for a first time or longer based on the visual line data, and setting a first region based on two or more gaze positions.

A sixteenth aspect according to the technology of the present disclosure is an information processing method comprising acquiring second image data, outputting the second image data to a display, acquiring visual line data, detecting a track along which a visual line position has varied within a second time with respect to a second image indicated by the second image data based on the visual line data, and setting a second region based on the track.

A seventeenth aspect according to the technology of the present disclosure is a program for causing a computer to execute a process comprising acquiring first image data, outputting the first image data to a display, acquiring visual line data, detecting, as a gaze position, a visual line position of a case where a state where a variation distance of the visual line position with respect to a first image indicated by the first image data is equal to or shorter than a first distance continues for a first time or longer based on the visual line data, and setting a first region based on two or more gaze positions.

An eighteenth aspect according to the technology of the present disclosure is a program for causing a computer to execute a process comprising acquiring second image data, outputting the second image data to a display, acquiring visual line data, detecting a track along which a visual line position has varied within a second time with respect to a second image indicated by the second image data based on the visual line data, and setting a second region based on the track.

DESCRIPTION OF THE PREFERRED EMBODIMENTS

Hereinafter, one example of an embodiment of an information processing apparatus, an information processing method, and a program according to the technology of the present disclosure will be described in accordance with the appended drawings.

First, terms that are used in the following description will be described.

OF is an abbreviation for "Interface". CPU is an abbreviation for "Central Processing Unit". NVM is an abbreviation for "Non-Volatile Memory". RAM is an abbreviation for "Random Access Memory". EEPROM Is an abbreviation of "Electrically Erasable and Programmable Read Only Memory". HDD is an abbreviation for "Hard Disk Drive". CMOS is an abbreviation for "Complementary Metal Oxide Semiconductor". CCD is an abbreviation for "Charge Coupled Device". SSD is an abbreviation for "Solid State Drive". EL is an abbreviation for "Electro Luminescence". LED is an abbreviation for "Light Emitting Diode". OLED is an abbreviation for "Organic Light-Emitting Diode". GPU is an abbreviation for "Graphics Processing Unit". TPU is an abbreviation for "Tensor Processing Unit". USB is an abbreviation for "Universal Serial Bus". ASIC is an abbreviation for "Application Specific Integrated Circuit". FPGA is an abbreviation for "Field-Programmable Gate Array". PLD is an abbreviation for "Programmable Logic Device". SoC is an abbreviation for "System-on-a-Chip". IC is an abbreviation for "Integrated Circuit".

First Embodiment

First, a first embodiment will be described.

Figure 1:
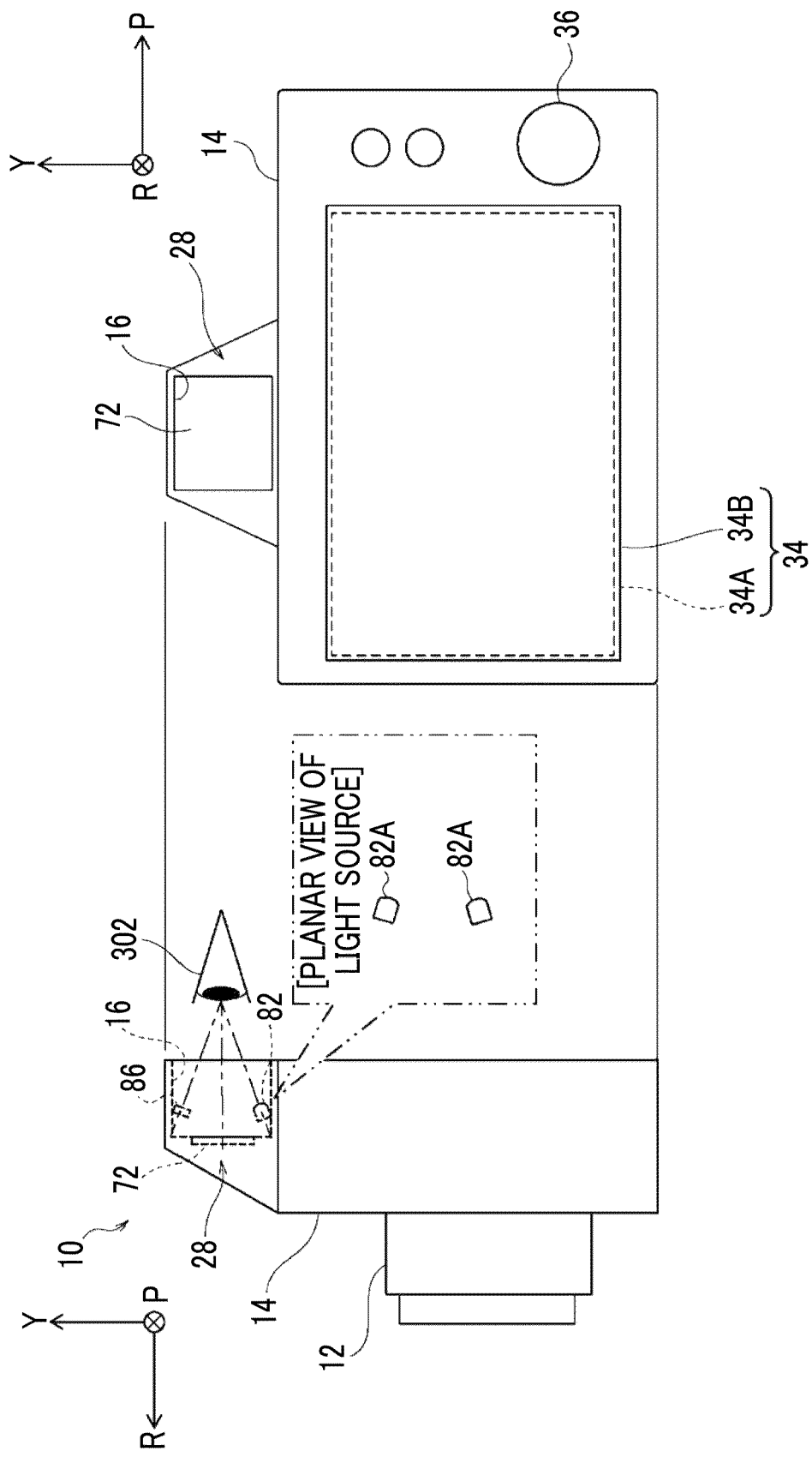
FIG. 1 is a two view diagram showing an example of a side surface and a rear surface of an imaging apparatus.

As shown in FIG. 1 as an example, an imaging apparatus 10 is a digital camera and comprises a lens unit 12 and an imaging apparatus main body 14. The imaging apparatus 10 is an example of an "information processing apparatus" and an "imaging apparatus" according to the technology of the present disclosure. A pitch axis, a yaw axis, and a roll axis are defined in the imaging apparatus 10. In the example shown in FIG. 1, an axis P indicates the pitch axis of the imaging apparatus 10, an axis Y indicates the yaw axis of the imaging apparatus 10, and an axis R indicates the roll axis of the imaging apparatus 10.

The lens unit 12 is attached to the imaging apparatus main body 14. A touch panel display 34 and an instruction key 36 are provided on a rear surface of the imaging apparatus main body 14. The touch panel display 34 is formed by a touch panel 34A and a display 34B, and for example, the touch panel 34A is superimposed on the display 34B.

An electronic viewfinder 28 is provided on an upper portion of the imaging apparatus main body 14. The electronic viewfinder 28 includes a display 72. A finder opening portion 16 is provided in the upper portion of the imaging apparatus main body 14, and the display 72 is provided inside the finder opening portion 16. The display 72 is disposed at a position where a user can see the display 72 with an eye 302 when looking into the finder opening portion 16. The display 72 is an example of a "display" according to the technology of the present disclosure.

A light source 82 and a visual line sensor 86 for visual line detection are provided inside the finder opening portion 16. The user's eye 302 looking into the finder opening portion 16 is a visual line detection target. The light source 82 includes a plurality of light emitters 82A. The plurality of light emitters 82A are arranged side by side in a pitch axis direction of the imaging apparatus 10, for example.

The light source 82 is disposed at a position where the light source 82 can irradiate the user's eye 302 with light in a case where the user looks into the finder opening portion 16. The light source 82 emits near-infrared light, for example. The visual line sensor 86 is disposed at a position where an image of the user's eye 302 can be captured when the user looks into the finder opening portion 16.

A half mirror (not shown) may be disposed inside the finder opening portion 16. The display 72 may be disposed on a passing optical axis of the half mirror, and the visual line sensor 86 may be disposed on the reflection optical axis of the half mirror.

Figure 2:
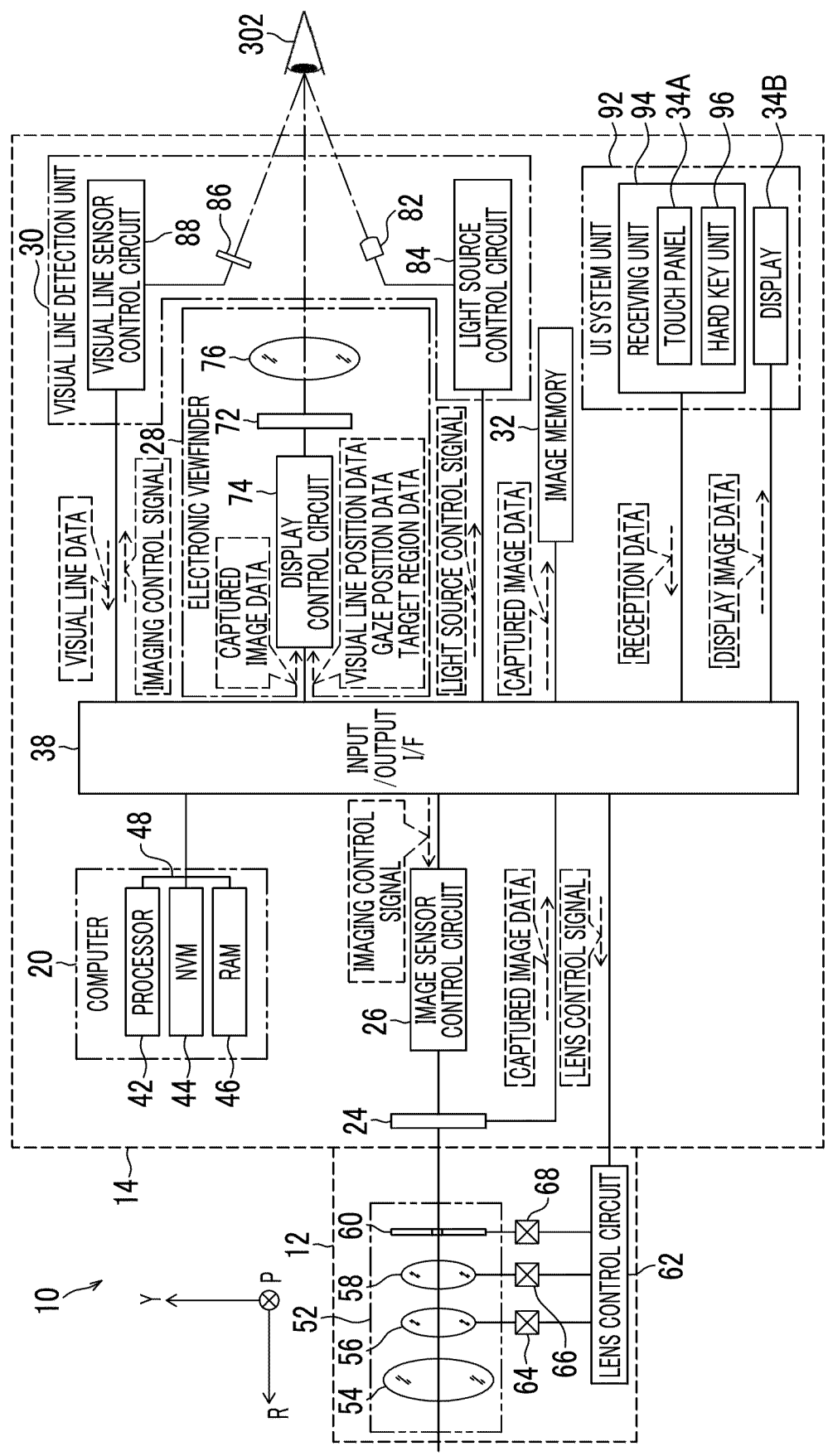
FIG. 2 is a block diagram showing an example of a hardware configuration of the imaging apparatus.

As shown in FIG. 2 as an example, the imaging apparatus main body 14 comprises a computer 20, an image sensor 24, an image sensor control circuit 26, an electronic viewfinder 28, a visual line detection unit 30, an image memory 32, a UI system unit 92, and an input/output OF 38. The image sensor 24, the image sensor control circuit 26, the image memory 32, and the UI system unit 92 are connected to the input/output OF 38.

The computer 20 comprises a processor 42, a NVM 44, and a RAM 46. The processor 42 controls the entire imaging apparatus 10. The processor 42 is, for example, a processing unit including a CPU and a GPU, and the GPU operates under the control of the CPU and executes processing related to an image. Here, a processing unit including a CPU and a GPU has been described as an example of the processor 42, but this is merely an example, and the processor 42 may be one or more CPUs into which a GPU function is integrated, or may be one or more CPUs into which a GPU function is not integrated. The processor 42, the NVM 44, and the RAM 46 are connected via a bus 48, and the bus 48 is connected to the input/output I/F 38. The computer 20 is an example of a "computer" according to the technology of the present disclosure. The processor 42 is an example of a "processor" according to the technology of the present disclosure.

The NVM 44 is a non-transitory storage medium and stores various parameters and various programs. For example, the NVM 44 is a flash memory (for example, EEPROM). However, this is merely an example, and an HDD or the like may be applied as NVM 44 together with a flash memory. A RAM 46 temporarily stores various kinds of information and is used as a work memory.

The processor 42 reads a necessary program from the NVM 44 and executes the read program in the RAM 46. The processor 42 controls the image sensor 24, the image sensor control circuit 26, the electronic viewfinder 28, the visual line detection unit 30, the image memory 32, and the UI system unit 92 according to the program executed in the RAM 46.

The image sensor 24 is, for example, a CMOS image sensor. Here, although the CMOS image sensor is exemplified as the image sensor 24, the technology of the present disclosure is not limited thereto, and for example, even in a case where the image sensor 24 is another type of image sensor such as a CCD image sensor, the technology of the present disclosure is valid. An image sensor control circuit 26 is connected to the image sensor 24. The image sensor control circuit 26 controls the image sensor 24 according to an imaging control signal from the processor 42.

Subject light is incident on an imaging lens 52 of the lens unit 12 to be described later. The subject light is imaged on a light-receiving surface of the image sensor 24 by the imaging lens 52. Photoelectric conversion element (not shown) is provided on the light-receiving surface of the image sensor 24. The photoelectric conversion elements photoelectrically convert the subject light received by the light-receiving surface and output an electric signal corresponding to an amount of the subject light as analog image data indicating the subject light under the control of the image sensor control circuit 26. The image sensor 24 includes a signal processing circuit (not shown). The signal processing circuit generates digital captured image data by digitizing the analog image data, and outputs the captured image data.

The captured image data generated by the image sensor 24 is temporarily stored in the image memory 32. The processor 42 acquires the captured image data from the image memory 32 and executes various kinds of processing using the acquired captured image data.

The lens unit 12 comprises the imaging lens 52. The imaging lens 52 has, for example, an objective lens 54, a focus lens 56, a zoom lens 58, and a stop 60. Further, the lens unit 12 comprises a lens control circuit 62, a first actuator 64, a second actuator 66, and a third actuator 68. The lens control circuit 62 is connected to the first actuator 64, the second actuator 66, and the third actuator 68, and the lens control circuit 62 is connected to the input/output OF 38. The lens control circuit 62 controls the first actuator 64, the second actuator 66, and the third actuator 68 according to a lens control signal from the processor 42.

The first actuator 64 moves the focus lens 56 along an optical axis OA. A position of focus is adjusted by changing a position of the focus lens 56. The second actuator 66 moves the zoom lens 58 along the optical axis OA. A focal length is adjusted by changing a position of the zoom lens 58. The third actuator 68 changes a size of an opening of the stop 60. A stop amount by the stop 60 is changed by changing the size of the opening of the stop 60 so that an exposure is adjusted. The first actuator 64, the second actuator 66, and the third actuator 68 are, for example, piezoelectric elements, voice coil motors, or the like.

The electronic viewfinder 28 includes the display 72, a display control circuit 74, and an eyepiece lens 76. The display 72 is, for example, a liquid crystal display, an EL display, or the like. The display control circuit 74 is connected to the input/output OF 38. The processor 42 selectively outputs the captured image data, visual line position data, gaze position data, and target region data to the display control circuit 74 as described later. The display control circuit 74 displays an image on the display 72 according to the captured image data, the visual line position data, the gaze position data, and the target region data. The eyepiece lens 76 is disposed to face a screen of the display 72.

The visual line detection unit 30 has the light source 82, a light source control circuit 84, the visual line sensor 86, and a visual line sensor control circuit 88. The light source 82 is, for example, an LED that outputs near-infrared light. The light source control circuit 84 is connected to the input/output OF 38. The light source control circuit 84 controls the light source 82 according to a light source control signal from the processor 42.

The visual line sensor 86 is, for example, a CMOS image sensor having sensitivity to near-infrared light. Here, although the CMOS image sensor is exemplified as the visual line sensor 86, the technology of the present disclosure is not limited thereto, and for example, even in a case where the visual line sensor 86 is another type of image sensor such as a CCD image sensor, the technology of the present disclosure is valid. The visual line sensor control circuit 88 is connected to the visual line sensor 86. The visual line sensor control circuit 88 controls the visual line sensor 86 according to an imaging control signal from the processor 42. The visual line sensor 86 captures an image of a subject (for example, the user's eye 302), and outputs visual line data obtained by capturing the image.

The UI system unit 92 comprises the display 34B. The processor 42 outputs display image data to the display 34B, and causes the display 34B to display an image and various kinds of information based on the display image data. Further, the UI system unit 92 comprises a receiving unit 94 that receives an instruction from the user. The receiving unit 94 comprises the touch panel 34A and a hard key unit 96. The hard key unit 96 is a plurality of hard keys including the instruction key 36 (refer to FIG. 1). The receiving unit 94 outputs reception data corresponding to various instructions received by the touch panel 34A and/or the hard key unit 96.

Figure 3:
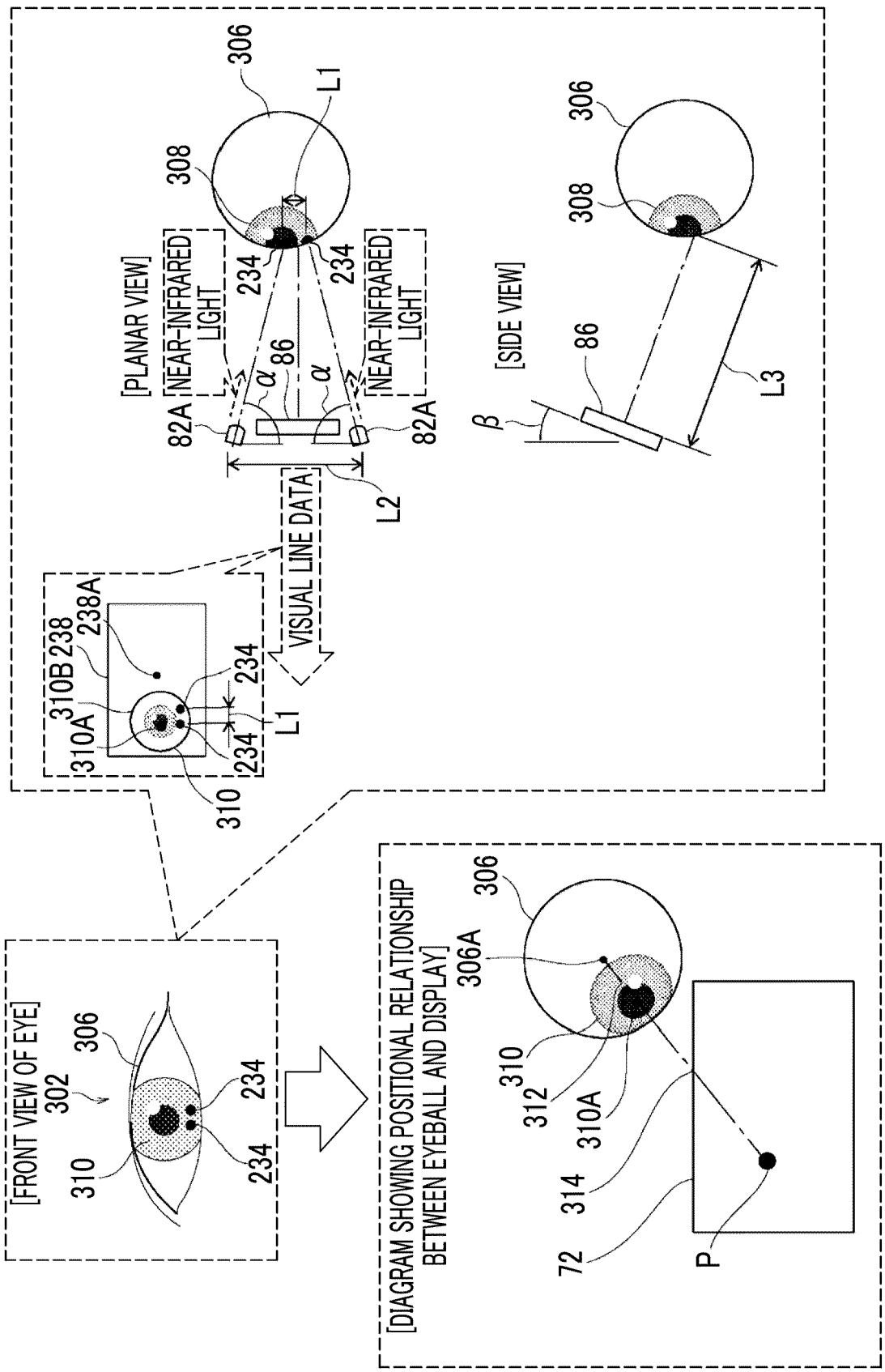
FIG. 3 is an explanatory diagram showing an example of a method of detecting a visual line position.

FIG. 3 shows an example of a method of detecting a visual line position based on the visual line data. In the example shown in FIG. 3, near-infrared light is emitted from the plurality of light emitters 82A to an eyeball 306, and the near-infrared light is reflected by a surface of a cornea 308, whereby a dot pattern 234 is formed on the surface of the cornea 308. A distance L1 between the patterns 234 are obtained from an image 238 obtained by imaging the eyeball 306 with the visual line sensor 86.

A distance L3 between the visual line sensor 86 and the eyeball 306 is obtained from a known distance L2 between the plurality of light emitters 82A, a known attachment angle α of the plurality of light emitters 82A, a known attachment angle of the visual line sensor 86, and the distance L1 between the patterns 234. Further, positions of a center 310A of a pupil 310 and an outer shape 310B of the pupil 310 with respect to a center 238A of the image 238 are obtained from the image 238 obtained by imaging the eyeball 306 with the visual line sensor 86. Coordinates of a center 306A of the eyeball 306 and coordinates of the center 310A of the pupil 310 are obtained based on the positions of the center 310A of the pupil 310 and the outer shape 310B of the pupil 310 with respect to the center 238A of the image 238, the distance L3 between the visual line sensor 86 and the eyeball 306, and a curvature radius predetermined for the eyeball 306. For example, a statistically obtained numerical value is applied to the curvature radius of the eyeball 306.

A direction in which a line 312 connecting the coordinates of the center 306A of the eyeball 306 and the coordinates of the center 310A of the pupil 310 extends corresponds to a direction of a visual line of the eye 302. Further, an extension line 314 obtained by extending the line 312 connecting the coordinates of the center 306A of the eyeball 306 and the coordinates of the center 310A of the pupil 310 indicates the visual line of the eye 302, and a point Pat which the visual line of the eye 302 and the screen of the display 72 intersect corresponds to a position of the visual line of the eye 302. As described above, the position of the visual line of the eye 302 is detected based on the visual line data obtained by imaging the eyeball 306 with the visual line sensor 86. Hereinafter, the "position of the visual line of the eye 302" is also referred to as a "visual line position" or a "visual line position with respect to the display 72". The visual line position is an example of a "visual line position" according to the technology of the present disclosure.

Note that the above-described method of detecting the visual line position is merely an example, and the technology of the present disclosure is not limited thereto. In addition to the above-described method of detecting the visual line position, various methods of detecting the visual line position with respect to the display 72 based on the visual line data obtained by imaging the eyeball 306 with the visual line sensor 86 in a state where the patterns 234 are formed on the surface of the cornea 308 can be applied to the technology of the present disclosure. Further, although the visual line position is detected based on reflected light reflected by the surface of the cornea 308 in the above-described method of detecting the visual line position, the visual line position may be detected based on reflected light reflected by a portion other than the cornea 308 (for example, a retina or the like).

Figure 4:
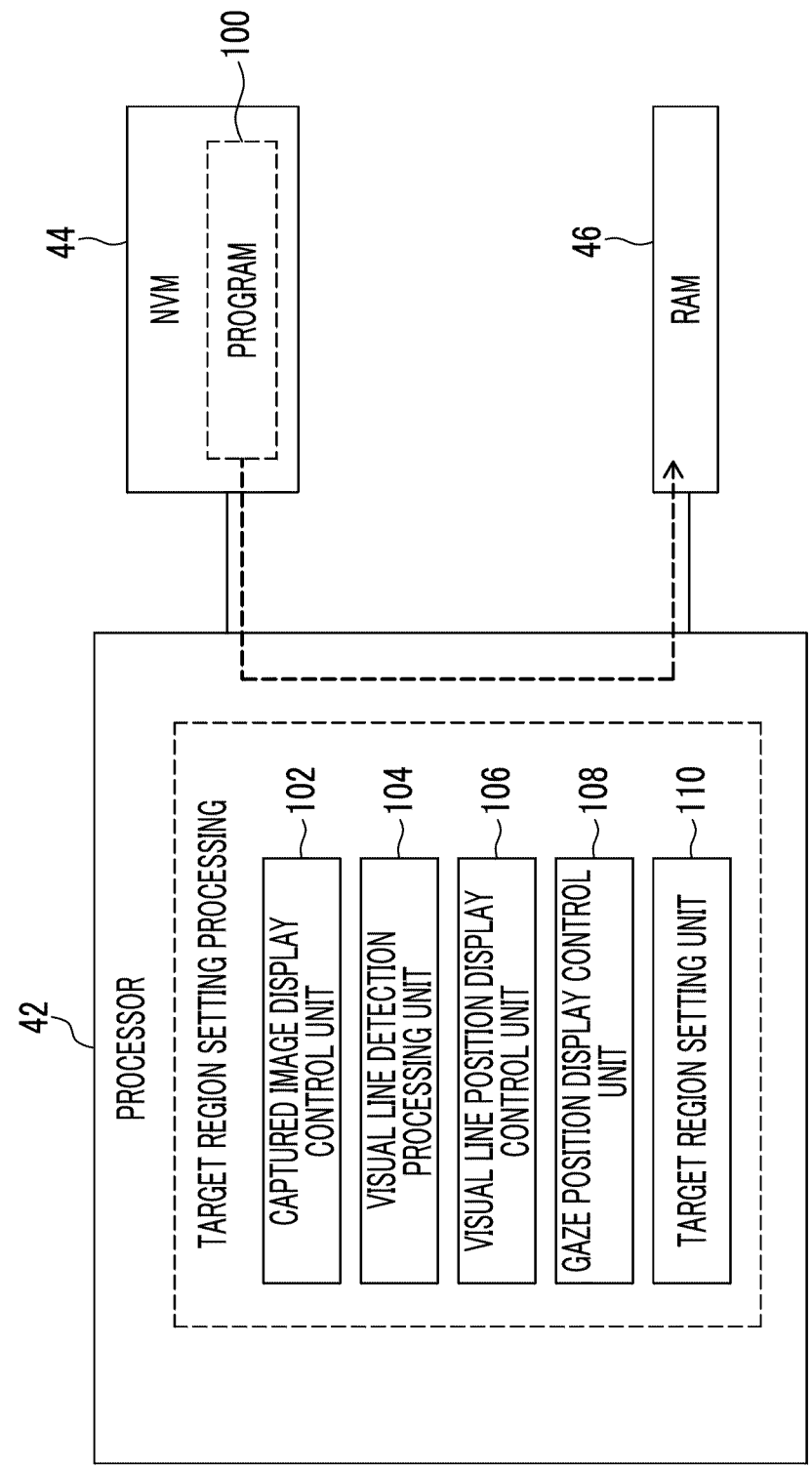
FIG. 4 is a block diagram showing an example of a functional configuration of a processor according to a first embodiment.

As shown in FIG. 4 as an example, a program 100 is stored in the NVM 44 of the imaging apparatus 10. The program 100 is an example of a "program" according to the technology of the present disclosure. The processor 42 reads the program 100 from the NVM 44 and executes the read program 100 in the RAM 46. The processor 42 performs target region setting processing according to the program 100 executed in the RAM 46. The target region setting processing is executed by the processor 42 operating as a captured image display control unit 102, a visual line detection processing unit 104, a visual line position display control unit 106, a gaze position display control unit 108, and a target region setting unit 110 according to the program 100.

The imaging apparatus 10 has a plurality of operation modes and operates under a designated operation mode. For example, the target region setting processing is executed in a case where a target region setting mode is set as the operation mode of the imaging apparatus 10. The target region setting mode is set in the imaging apparatus 10, for example, in a case where a target region setting mode setting instruction is received by the receiving unit 94 (refer to FIG. 2). The target region setting mode setting instruction refers to, for example, an instruction to shift from an operation mode other than the target region setting mode to the target region setting mode.

Figure 5:
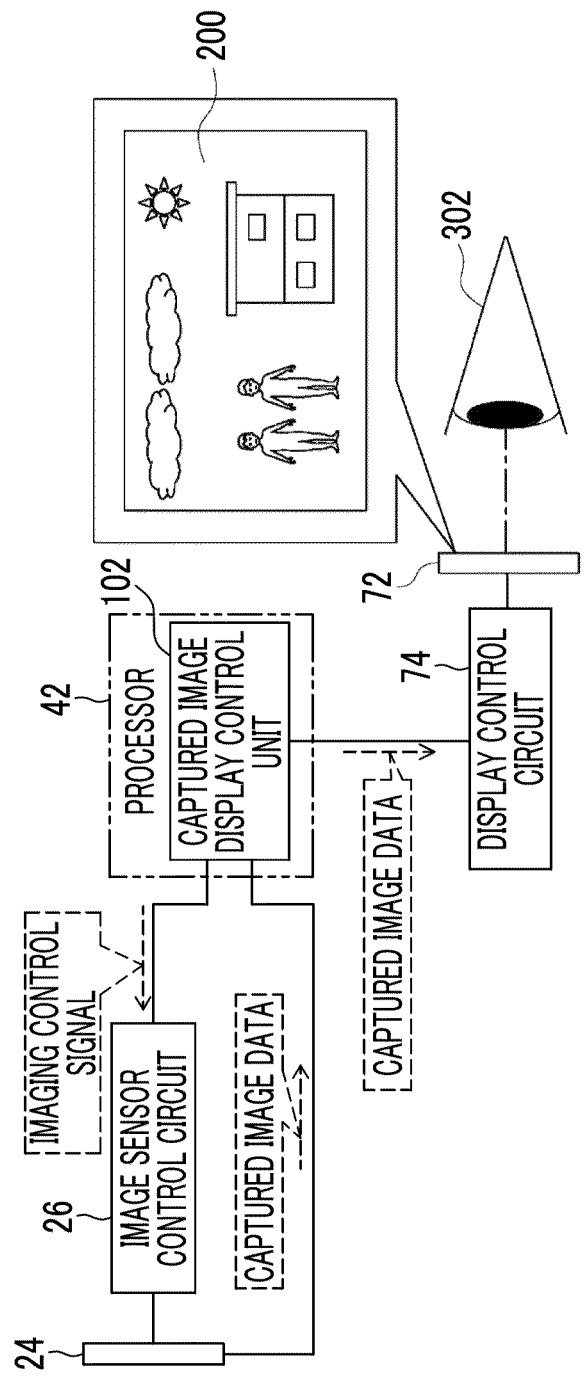
FIG. 5 is an explanatory diagram showing an example of a first operation of the processor according to the first embodiment.

As shown in FIG. 5 as an example, the captured image display control unit 102 causes the display 72 to display a captured image 200. Specifically, the captured image display control unit 102 performs the following processing. That is, the captured image display control unit 102 causes the image sensor 24 to image the subject (not shown) through the image sensor control circuit 26 by outputting the imaging control signal to the image sensor control circuit 26. Subsequently, the captured image display control unit 102 acquires the captured image data obtained by imaging the subject with the image sensor 24, and outputs the acquired captured image data to the display 72. The display 72 displays the captured image 200 indicated by the captured image data. Accordingly, the captured image 200 in which the subject is included as an image is displayed on the display 72. The captured image data is an example of "first image data" according to the technology of the present disclosure. The captured image 200 is an example of a "first image" according to the technology of the present disclosure.

Figure 6:
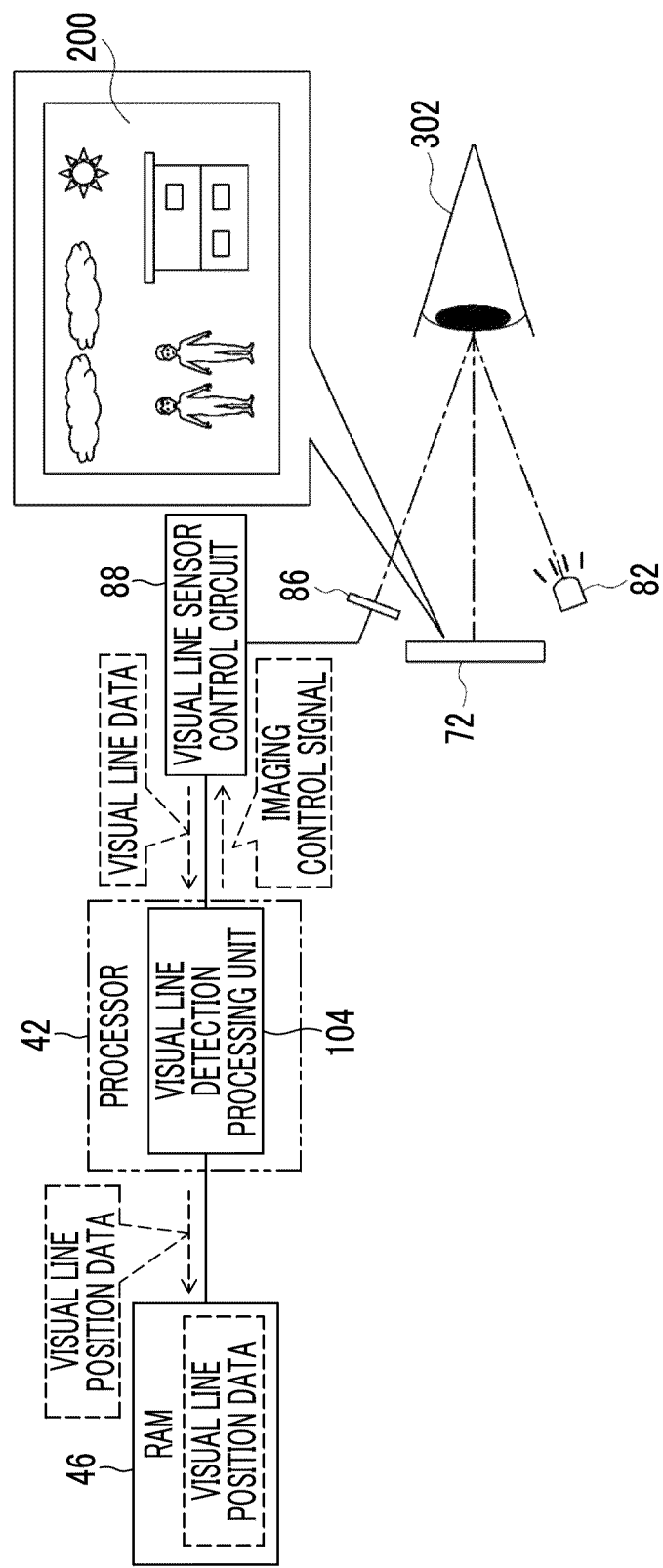
FIG. 6 is an explanatory diagram showing an example of a second operation of the processor according to the first embodiment.

As shown in FIG. 6 as an example, the visual line detection processing unit 104 detects the visual line position of the user viewing the display 72 on which the captured image 200 is displayed. Specifically, the visual line detection processing unit 104 performs the following processing. That is, the visual line detection processing unit 104 causes the visual line sensor 86 to image the subject (for example, the user's eye 302) through the visual line sensor control circuit 88 by outputting the imaging control signal to the visual line sensor control circuit 88. Then, the visual line detection processing unit 104 acquires the visual line data obtained by being imaged by the visual line sensor 86, and detects the visual line position with respect to the display 72 based on the acquired visual line data. The method of detecting the visual line position is as described in FIG. 3. Thus, the visual line position of the user looking at the display 72 on which the captured image 200 is displayed is detected. The visual line data is an example of "visual line data" according to the technology of the present disclosure. The visual line detection processing unit 104 generates the visual line position data indicating the visual line position and stores the visual line position data in the RAM 46 in a case of detecting the visual line position.

The light source 82 may continue to emit the near-infrared light in a case where power of the imaging apparatus 10 is turned on. Further, the light source 82 may emit the near-infrared light in a case where the visual line position is detected by the visual line detection processing unit 104, and may stop emitting the near-infrared light in a case where the visual line position is not detected by the visual line detection processing unit 104.

Figure 7:
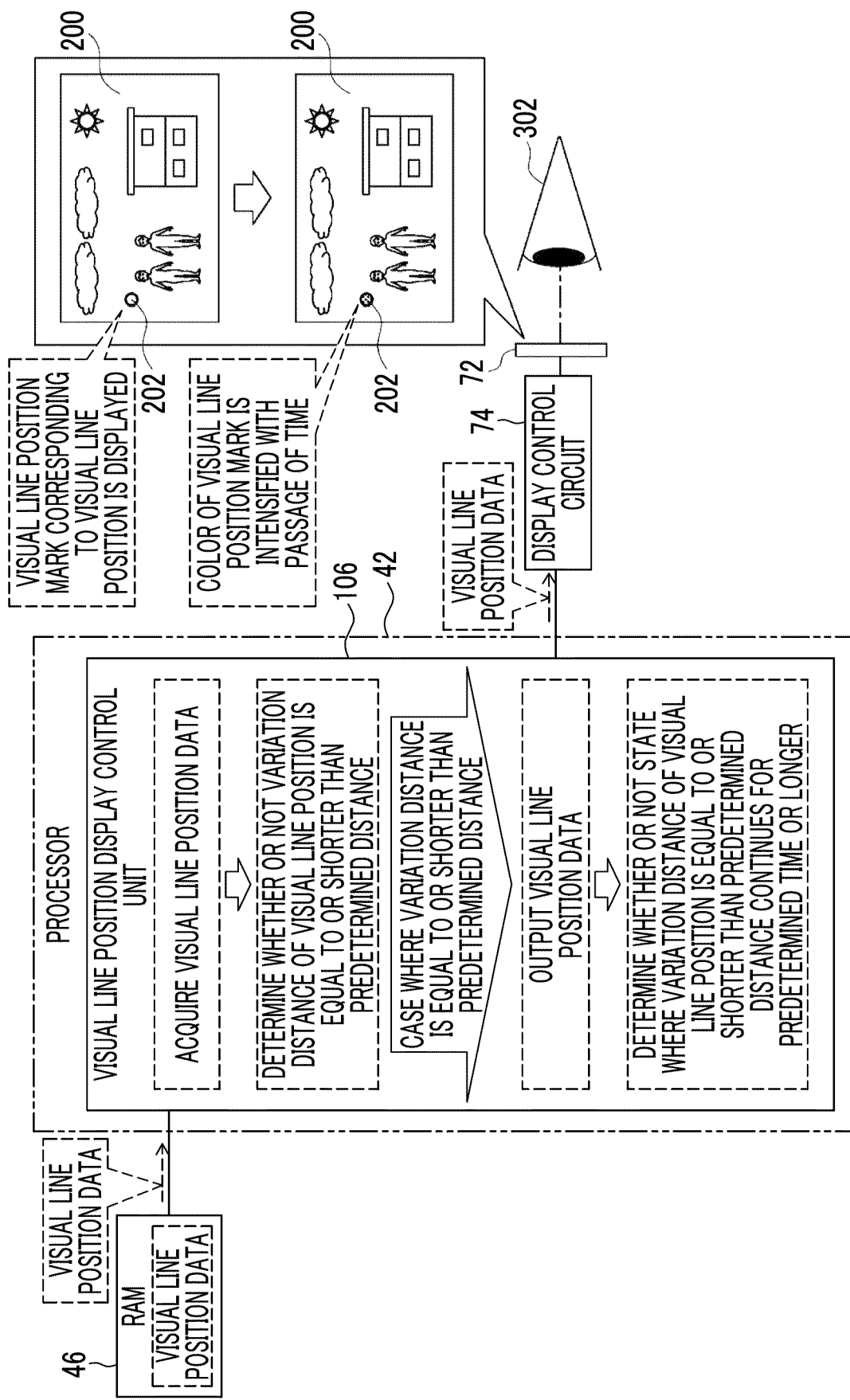
FIG. 7 is an explanatory diagram showing an example of a third operation of the processor according to the first embodiment.

As shown in FIG. 7 as an example, the visual line position display control unit 106 causes the display 72 to display a visual line position mark 202 corresponding to the visual line position. Specifically, the visual line position display control unit 106 performs the following processing. That is, the visual line position display control unit 106 acquires all the visual line position data stored in the RAM 46 since the target region setting processing is started. Then, the visual line position display control unit 106 determines whether or not a variation distance of the visual line position is equal to or shorter than a predetermined distance based on the acquired visual line position data.

The variation distance may be, for example, a total distance by which the visual line position has moved, but is a distance indicating a radius or a diameter of a range in which the visual line position has moved with reference to an initially detected visual line position. The variation distance of the visual line position is calculated by, for example, an average value, a maximum value, or the like of the variation distance of the visual line position indicated by all of the visual line position data stored in RAM 46. The predetermined distance is set to, for example, a distance at which it is recognized that the visual line position is gazed at. The predetermined distance is an example of a "first distance" according to the technology of the present disclosure.

The visual line position display control unit 106 outputs the visual line position data including the visual line position mark 202 that is a mark indicating the visual line position on the captured image 200 to the display 72 in a case of determining that the variation distance of the visual line position is equal to or shorter than the predetermined distance. The visual line position indicated by the visual line position mark 202 is set based on, for example, an average value or the like of the visual line position indicated by all of the visual line position data stored in the RAM 46.

The display 72 displays the visual line position mark 202 indicated by the visual line position data by superimposing the visual line position mark 202 on the captured image 200. In this way, the visual line position mark 202 corresponding to the visual line position is displayed on the display 72.

Subsequently, the visual line position display control unit 106 determines whether or not a state where the variation distance of the visual line position is equal to or shorter than the predetermined distance continues for a predetermined time or longer. The predetermined time is set to, for example, a time during which it is recognized that the visual line position is gazed at. The predetermined time is an example of a "first time" according to the technology of the present disclosure. The above-described processing of acquiring the captured image data (refer to FIG. 5), the above-described processing of acquiring the visual line data (refer to FIG. 6), and the above-described processing of outputting the visual line position data are executed again in a case where the visual line position display control unit 106 determines that a state where the variation distance of the visual line position is equal to or shorter than the predetermined distance does not continue for the predetermined time or longer. Accordingly, the visual line position data is repeatedly output to the display 72 in a case where a state where the variation distance of the visual line position is equal to or shorter than the predetermined distance does not continue for the predetermined time or longer. As described above, the visual line position data indicating the visual line position mark 202 specifying the visual line position in the captured image 200 is output to the display 72 until the predetermined time is reached. The visual line position data is an example of "data indicating a visual line position mark" according to the technology of the present disclosure. The visual line position mark 202 is an example of a "visual line position mark" according to the technology of the present disclosure.

The visual line position display control unit 106 changes a form of the visual line position mark 202 with the passage of time in a case of repeatedly outputting the visual line position data to the display 72. For example, the visual line position display control unit 106 performs processing of intensifying color of the visual line position mark 202 with the passage of time. The visual line position display control unit 106 may perform, for example, processing of intensifying a form other than the color, such as a shape, of the visual line position mark 202 with the passage of time.

Figure 8:
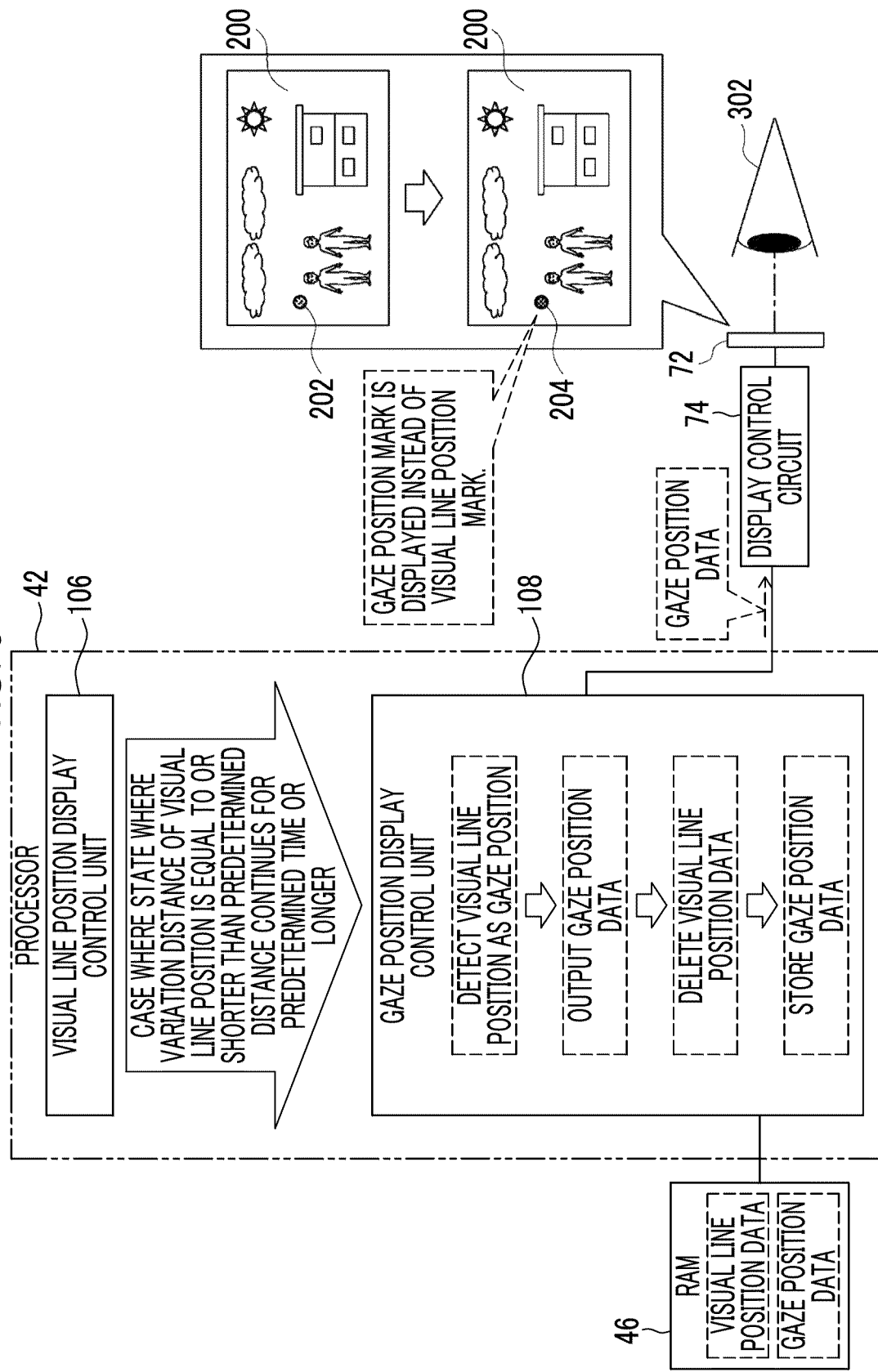
FIG. 8 is an explanatory diagram showing an example of a fourth operation of the processor according to the first embodiment.

As shown in FIG. 8 as an example, in a case where the visual line position display control unit 106 determines that a state where the variation distance of the visual line position is equal to or shorter than the predetermined distance continues for the predetermined time or longer, the gaze position display control unit 108 detects, as a gaze position, a visual line position of a case where a state where a variation distance of the visual line position with respect to the captured image 200 is equal to or shorter than the predetermined distance continues for the predetermined time or longer. Then, the gaze position display control unit 108 outputs the gaze position data including a gaze position mark 204 that is a mark indicating the gaze position on the captured image 200 to the display 72. As described above, the gaze position data indicating the gaze position mark 204 specifying the gaze position in the captured image 200 is output to the display 72 in a case where the predetermined time is reached. The display 72 displays the gaze position mark 204 indicated by the gaze position data by superimposing the gaze position mark 204 on the captured image 200 instead of the visual line position mark 202.

It is desirable that the gaze position mark 204 has a form different from that of the visual line position mark 202 in order to indicate that the gaze position has been detected from the visual line position. In the example shown in FIG. 8, the gaze position mark 204 is displayed in a color more intense than the visual line position mark 202. The gaze position is an example of a "gaze position" according to the technology of the present disclosure. The gaze position data is an example of "data indicating a gaze position mark" according to the technology of the present disclosure. The gaze position mark 204 is an example of a "gaze position mark" according to the technology of the present disclosure.

After outputting gaze position data to the display 72, the gaze position display control unit 108 deletes the visual line position data stored in the RAM 46. Further, the gaze position display control unit 108 generates gaze position data indicating a gaze position and stores the gaze position data in the RAM 46 in a case of detecting the gaze position. Then, the above-described processing from the acquisition of the captured image data to the storage of the gaze position data into RAM 46 is repeatedly executed, whereby a plurality of pieces of gaze position data are stored in the RAM 46.

Figure 9:
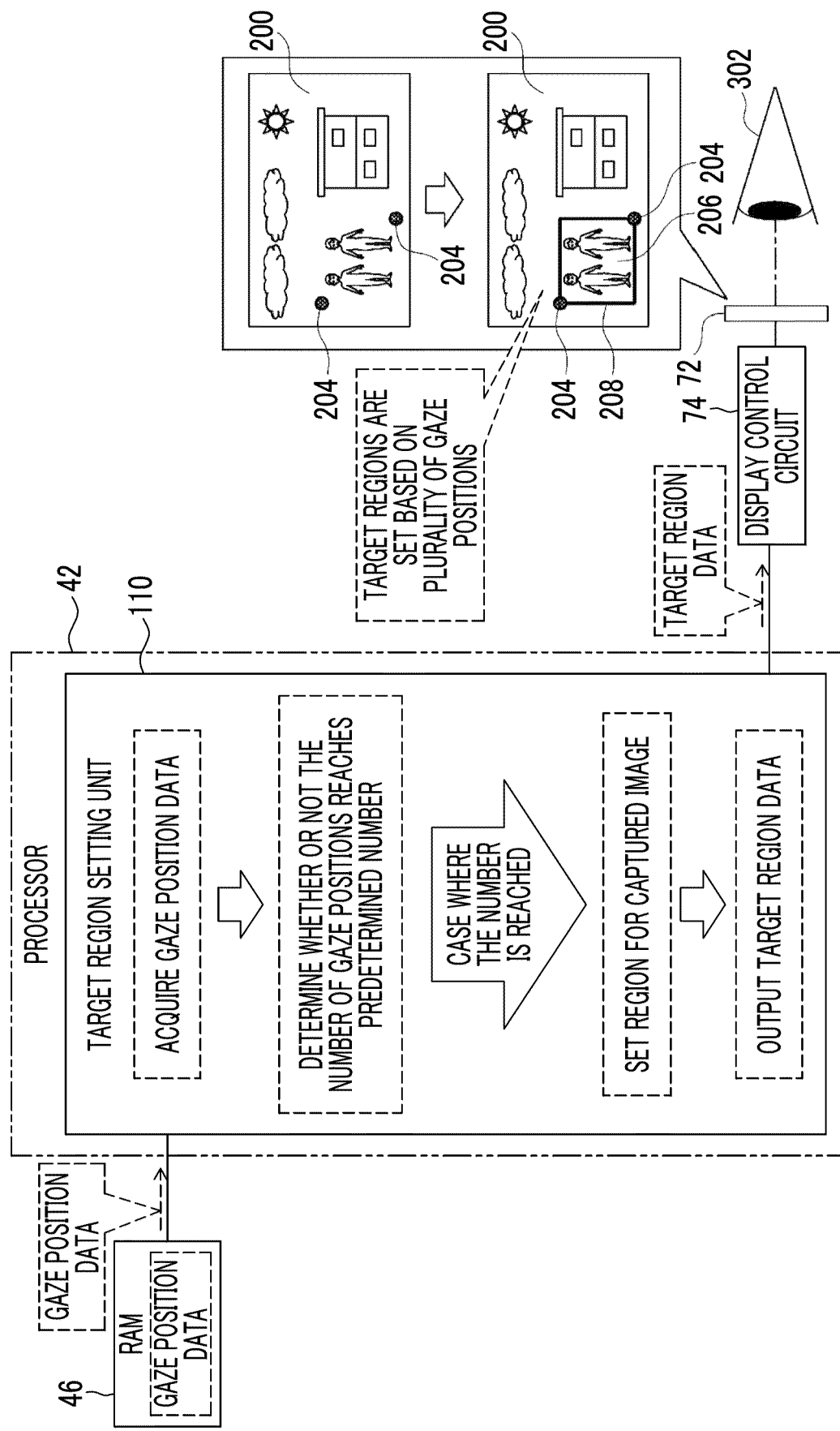
FIG. 9 is an explanatory diagram showing an example of a fifth operation of the processor according to the first embodiment.

As shown in FIG. 9 as an example, the target region setting unit 110 sets a target region 206 for the captured image 200 based on a plurality of gaze positions. Specifically, the target region setting unit 110 performs the following processing. That is, the target region setting unit 110 acquires all the gaze position data stored in the RAM 46 since the target region setting processing is started. Subsequently, the target region setting unit 110 determines whether or not the number of the detected gaze positions reaches a predetermined number based on the acquired gaze position data. The number of detected gaze positions corresponds to the number of the pieces of gaze position data stored in the RAM 46. The predetermined number is set to a number with which the target region 206 can be set for the captured image 200 based on the gaze positions. In the first embodiment, for example, the predetermined number is set to two.

The above-described processing from the acquisition of the captured image data to the output of the gaze position data is executed again in a case where the target region setting unit 110 determines that the number of the detected gaze positions does not reach the predetermined number. FIG. 9 shows a state where two gaze positions are detected and two gaze position marks 204 are displayed on the display 72 by repeatedly executing the processing from the acquisition of the captured image data to the output of the gaze position data.

The target region setting unit 110 sets the target region 206 for the captured image 200 based on the detected gaze positions in a case of determining that the number of the detected gaze positions reaches the predetermined number. The target region setting unit 110 sets, for example, a rectangular region, which has the gaze positions indicated by the two gaze position marks 204 as opposite corners, as the target region 206 for the captured image 200. In this way, the target region 206 is set for the captured image 200 based on the plurality of gaze positions. Then, the target region setting unit 110 outputs target region data including a target region frame 208 indicating the target region 206 on the captured image 200 to the display 72. The display 72 displays the target region frame 208 indicated by the target region data by superimposing the target region frame 208 on the captured image 200 and the gaze position mark 204. The target region 206 is an example of a "first region" according to the technology of the present disclosure.

The target region 206 set in the above-described manner is utilized for, for example, adjustment of an exposure through automatic exposure, adjustment of an image quality through auto white balance, and/or the like. The target region setting processing may be executed from the beginning in the above-described process of setting a region in a case where the receiving unit 94 (refer to FIG. 2) receives an instruction to delete the gaze positions. Accordingly, it is possible to set the gaze position again in a case where the gaze position is set at a position that the user does not desire.

In the first embodiment, the predetermined number is set to two as an example, but the predetermined number may be set to three or more. That is, the number of the gaze positions to be detected may be three or more.

Figure 10:
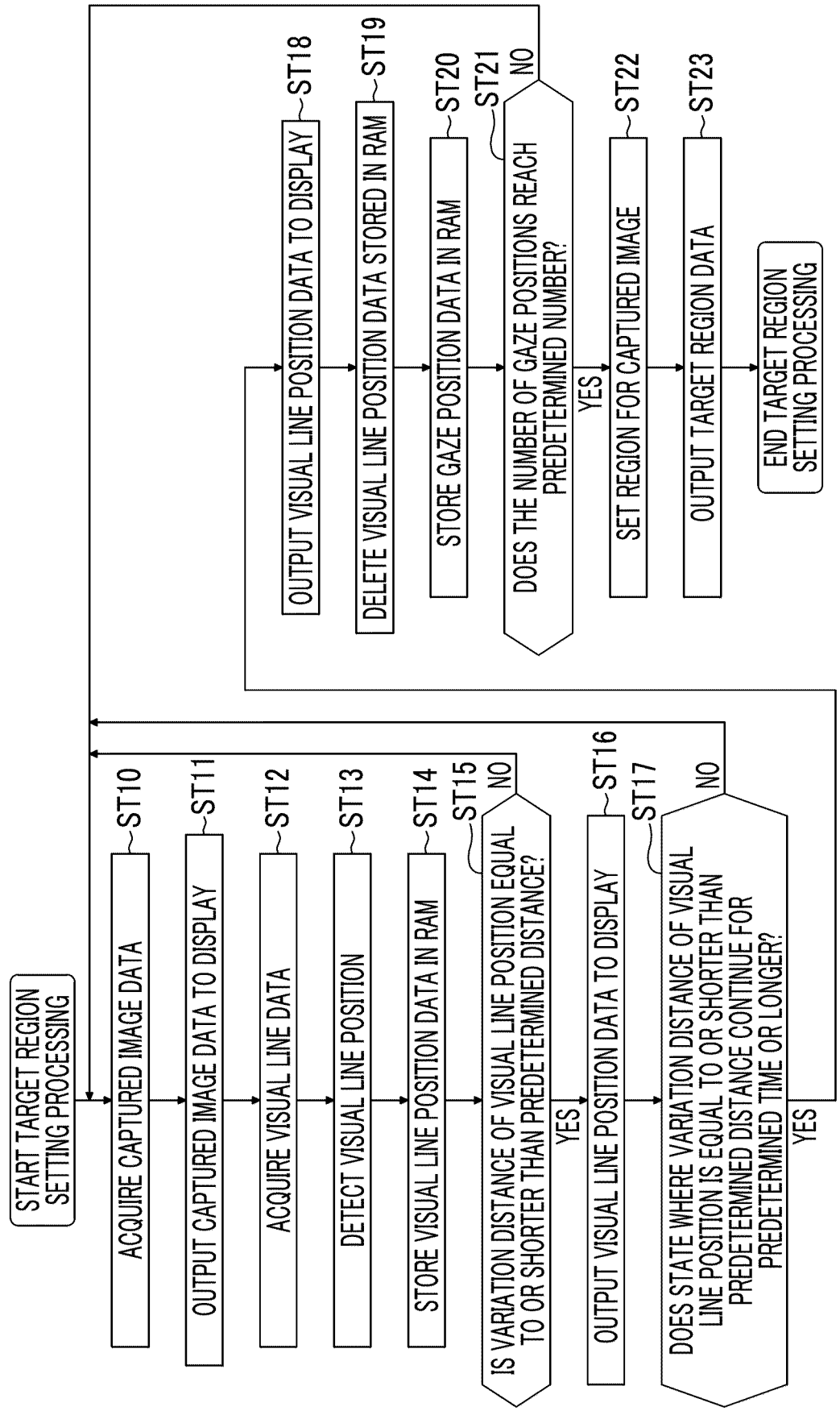
FIG. 10 is a flowchart showing an example of a flow of target region setting processing according to the first embodiment.

Next, an action of the imaging apparatus according to the first embodiment will be described with reference to FIG. 10. FIG. 10 shows an example of a flow of the target region setting processing according to the first embodiment.

In the target region setting processing shown in FIG. 10, first, in step ST10, the captured image display control unit 102 causes the image sensor 24 to image the subject. The captured image display control unit 102 acquires captured image data obtained by imaging the subject with the image sensor 24. After the processing of step ST10 is executed, the target region setting processing transitions to step ST11.

In step ST11, the captured image display control unit 102 outputs the captured image data acquired in step ST10 to the display 72. Accordingly, the captured image 200 is displayed on the display 72. After the processing of step ST11 is executed, the target region setting processing transitions to step ST12.

In step ST12, the visual line detection processing unit 104 acquires visual line data obtained by being imaged by the visual line sensor 86. After the processing of step ST12 is executed, the target region setting processing transitions to step ST13.

In step ST13, the visual line detection processing unit 104 detects the visual line position with respect to the display 72 based on the visual line data acquired in step ST12. After the processing of step ST13 is executed, the target region setting processing transitions to step ST14.

In step ST14, the visual line detection processing unit 104 generates the visual line position data indicating the visual line position detected in step ST13, and stores the visual line position data in the RAM 46. After the processing of step ST14 is executed, the target region setting processing transitions to step ST15.

In step ST15, the visual line position display control unit 106 acquires all the visual line position data stored in RAM 46 since the target region setting processing is started, and determines whether or not the variation distance of the visual line position is equal to or shorter than the predetermined distance based on the acquired visual line position data. In a case where the variation distance of the visual line position is not equal to or shorter than the predetermined distance in step ST15, the determination is negative and the target region setting processing transitions to step ST10. In a case where the variation distance of the visual line position is equal to or shorter than the predetermined distance in step ST15, the determination is positive and the target region setting processing transitions to step ST16.

In step ST16, the visual line position display control unit 106 outputs the visual line position data including the visual line position mark 202 indicating the visual line position to the display 72. Accordingly, the visual line position mark 202 indicated by the visual line position data is displayed on the display 72 while being superimposed on the captured image 200. After the processing of step ST16 is executed, the target region setting processing transitions to step ST17.

In step ST17, the visual line position display control unit 106 determines whether or not a state where the variation distance of the visual line position is equal to or shorter than the predetermined distance continues for the predetermined time or longer. In a case where a state where the variation distance of the visual line position is equal to or shorter than the predetermined distance does not continue for the predetermined time or longer in step ST17, the determination is negative and the target region setting processing transitions to step ST10. In a case where a state where the variation distance of the visual line position is equal to or shorter than the predetermined distance continues for the predetermined time or longer in step ST17, the determination is positive and the target region setting processing transitions to step ST18.

In step ST18, the gaze position display control unit 108 detects the visual line position as the gaze position, and outputs the gaze position data including the gaze position mark 204 indicating the detected gaze position to the display 72. Accordingly, the gaze position mark 204 indicated by the gaze position data is displayed on the display 72 while being superimposed on the captured image 200. After the processing of step ST18 is executed, the target region setting processing transitions to step ST19.

In step ST19, the gaze position display control unit 108 deletes the visual line position data stored in the RAM 46. After the processing of step ST19 is executed, the target region setting processing transitions to step ST20.

In step ST20, the gaze position display control unit 108 generates gaze position data indicating the gaze position detected in step ST18, and stores the gaze position data in the RAM 46. After the processing of step ST20 is executed, the target region setting processing transitions to step ST21.

In step ST21, the target region setting unit 110 acquires all gaze position data stored in the RAM 46 since the target region setting processing is started, and determines whether or not the number of the detected gaze positions reaches the predetermined number based on the acquired gaze position data. In a case where the number of the detected gaze positions does not reach the predetermined number in step ST21, the determination is negative and the target region setting processing transitions to step ST10. In a case where the number of the detected gaze positions reaches the predetermined number in step ST21, the determination is positive and the target region setting processing transitions to step ST22.

In step ST22, the target region setting unit 110 sets the target region 206 for the captured image 200 based on the plurality of gaze positions indicated by the plurality of pieces of gaze position data stored in the RAM 46 in step ST20. After the processing of step ST22 is executed, the target region setting processing transitions to step ST23.

In step ST23, the target region setting unit 110 outputs the target region data including the target region frame 208 indicating the target region 206 set in step ST22 to the display 72. Accordingly, the target region frame 208 indicated by the target region data is displayed on the display 72 while being superimposed on the captured image 200 and the gaze position mark 204. After the processing of step ST23 is executed, the target region setting processing ends. The above-described information processing method described as the action of the imaging apparatus is an example of an "information processing method" according to the technology of the present disclosure.

As described above, in the first embodiment, the processor 42 acquires the captured image data and outputs the captured image data to the display 72. Further, the processor 42 acquires the visual line data and detects, as a gaze position, a visual line position of a case where a state where a variation distance of the visual line position with respect to the captured image 200 indicated by the captured image data is equal to or shorter than the predetermined distance continues for the predetermined time or longer based on the visual line data. Then, the processor 42 sets the target region 206 based on the two or more gaze positions. Therefore, it is possible to set the target region 206 for the captured image 200 based on the visual line position.

Further, the processor 42 sets a rectangular region, which has two gaze positions as opposite corners, as the target region 206. Therefore, it is possible to set the target region 206 that is a rectangular region for the captured image 200 based on two visual line positions.

In addition, the processor 42 outputs the visual line position data indicating the visual line position mark 202 that specifies the visual line position in the captured image 200 until the predetermined time is reached, and outputs the gaze position data indicating the gaze position mark 204 specifying the gaze position in the captured image 200 in a case where the predetermined time is reached. Accordingly, it is possible to display the gaze position mark 204 at a gazed position by gazing the captured image 200 until the predetermined time is reached.

Further, the visual line position mark 202 changes in form with the passage of time. Therefore, for example, compared to a case where the form of the visual line position mark 202 is constant, it is possible to allow the user to recognize that the captured image 200 is being gazed.

Figure 11:
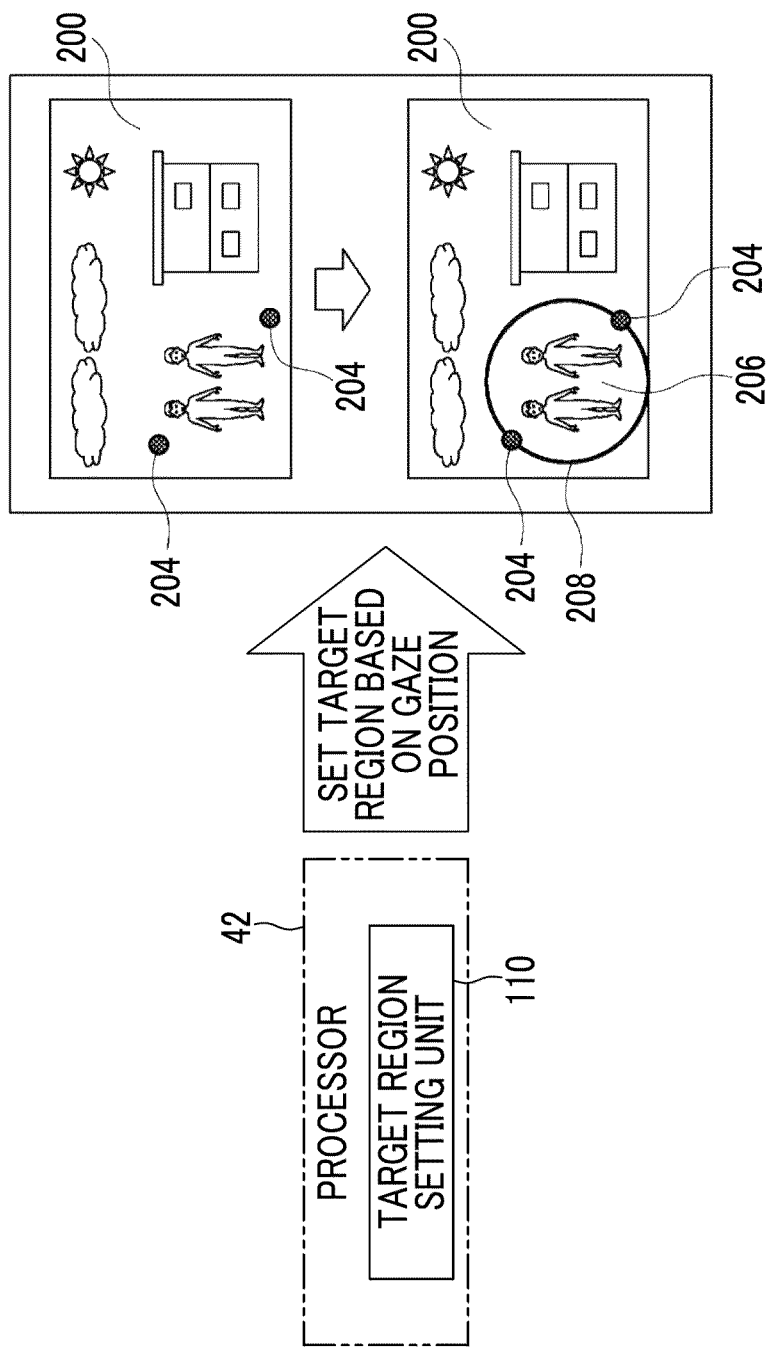
FIG. 11 is an explanatory diagram showing a modification example of the operation of the processor according to the first embodiment.

As shown in FIG. 11 as an example, the target region setting unit 110 may set a circular region having a line connecting two gaze positions as a diameter as the target region 206 for the captured image 200 in a case of setting the target region 206 based on the gaze position.

Further, the region set based on two or more gaze positions may have any shape.

Second Embodiment

Next, a second embodiment will be described.

Figure 12:
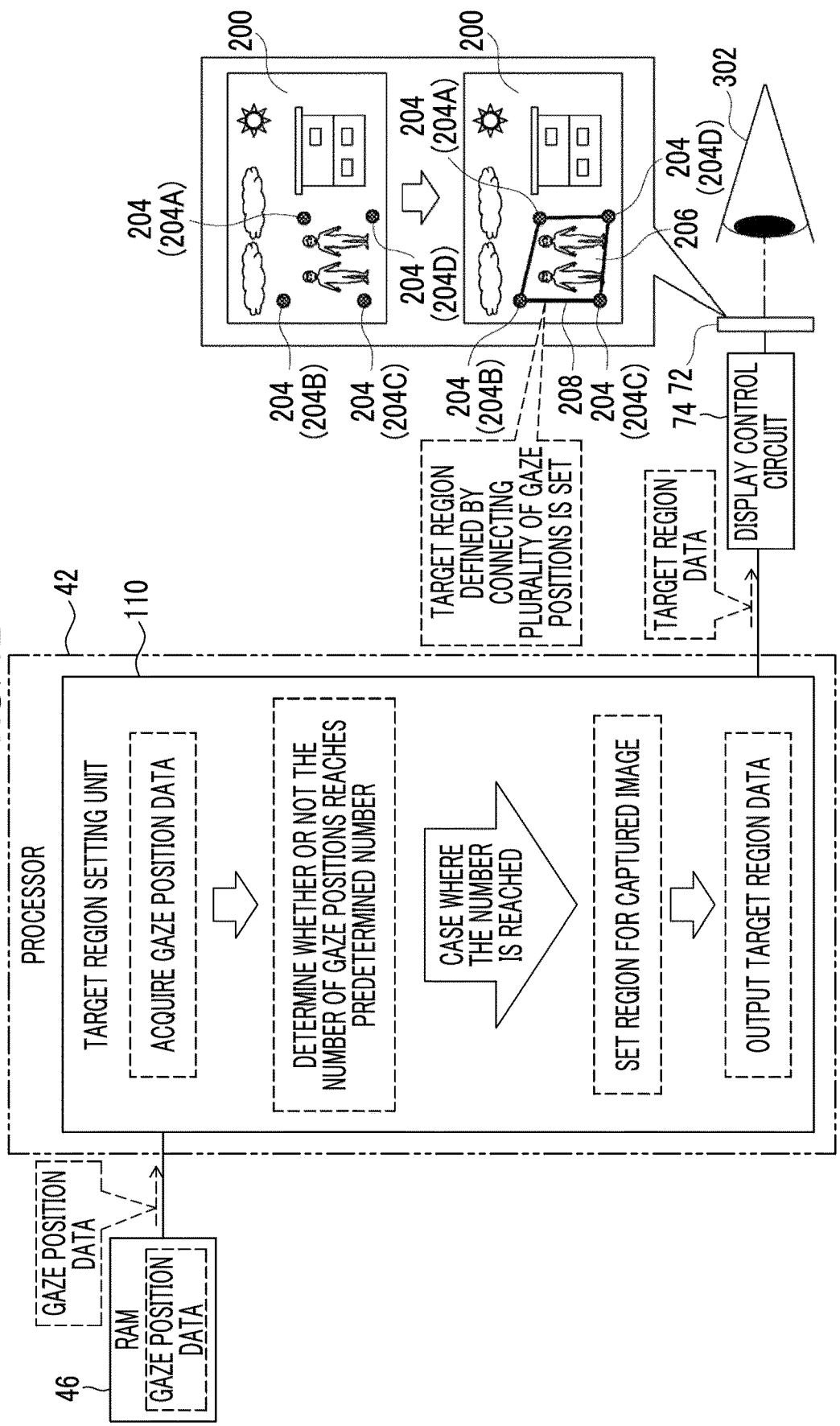
FIG. 12 is an explanatory diagram showing an example of an operation of a processor according to a second embodiment.

FIG. 12 shows the second embodiment. In the second embodiment, the first embodiment is modified as follows. Hereinafter, the second embodiment will be described based on an example in which four gaze positions are detected.

In the second embodiment, in a case where it is necessary to distinguish and describe a plurality of gaze position marks 204 corresponding to the plurality of gaze positions, the plurality of gaze position marks 204 are referred to as a gaze position mark 204A, a gaze position mark 204B, a gaze position mark 204C, and a gaze position mark 204D. In the example shown in FIG. 12, each gaze position corresponding to each gaze position mark 204 is detected in an order of the gaze position mark 204A, the gaze position mark 204B, the gaze position mark 204C, and the gaze position mark 204D.

In the second embodiment, for example, the predetermined number for setting the target region 206 based on the gaze positions is set to four.

The target region setting unit 110 acquires all the gaze position data stored in the RAM 46 since the target region setting processing is started, and determines whether or not the number of the detected gaze positions reaches the predetermined number based on the acquired gaze position data.

The target region setting unit 110 sets the target region 206 for the captured image 200 in a case of determining that the number of the detected gaze positions reaches the predetermined number. For example, the target region setting unit 110 sets, as the target region 206 for the captured image 200, a closed region defined by connecting four gaze positions in an order in which the four gaze positions indicated by the four gaze position marks 204 have been detected. Then, the target region setting unit 110 outputs the target region data including the target region frame 208 that is a mark indicating the target region 206 on the captured image 200 to the display 72. The display 72 displays the target region frame 208 indicated by the target region data by superimposing the target region frame 208 on the captured image 200 and the gaze position mark 204.

In the second embodiment, the processor 42 sets, as the target region 206 for the captured image 200, a closed region defined by connecting the four gaze positions in the order in which the four gaze positions have been detected. Therefore, it is possible to set the target region 206 that is a closed region for the captured image 200 based on four visual line position.

In the second embodiment, the target region 206 may be set based on three gaze positions, or may be set based on five or more gaze positions.

Third Embodiment

Next, a third embodiment will be described.

Figure 13:
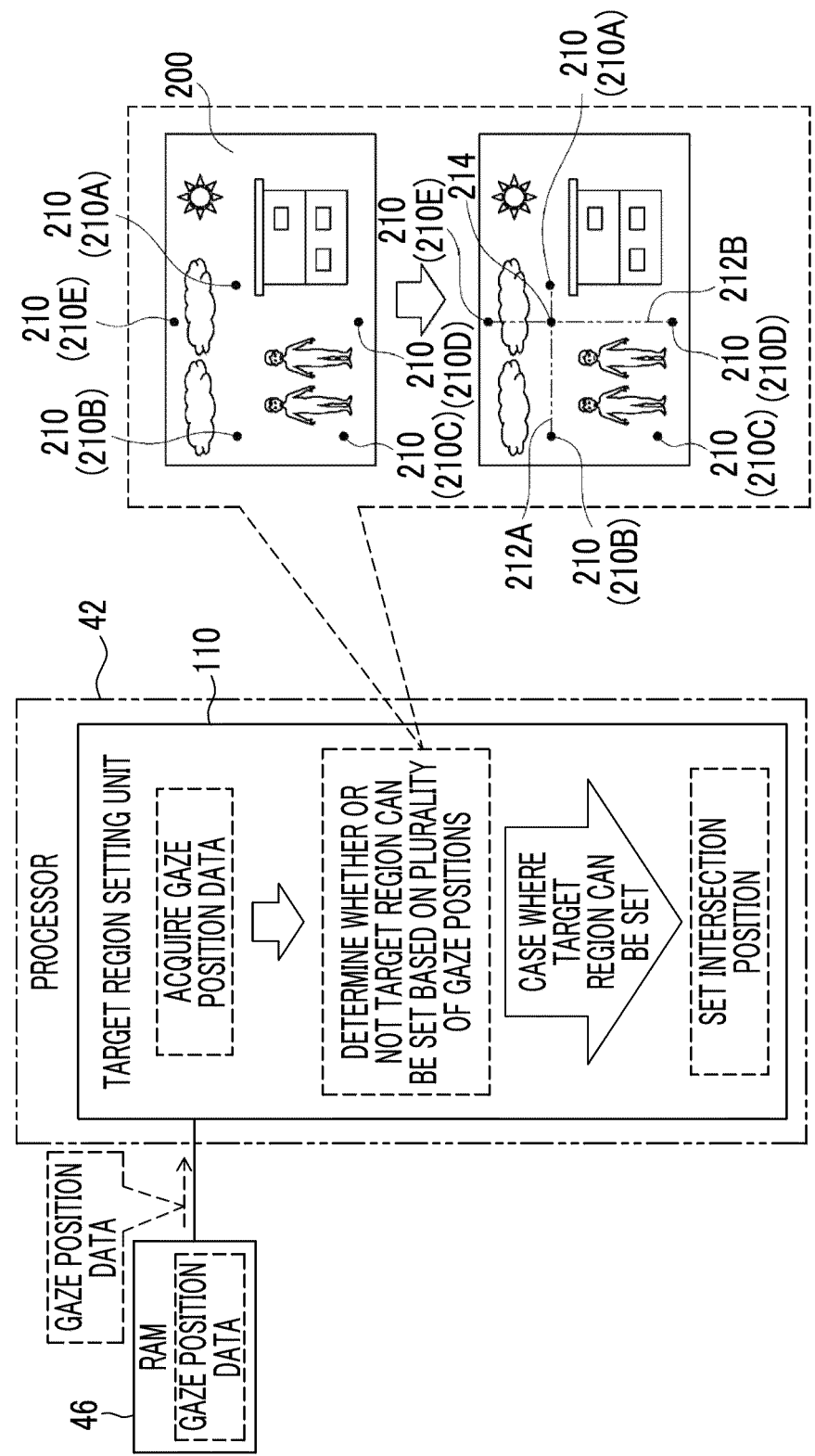
FIG. 13 is an explanatory diagram showing an example of a first operation of a processor according to a third embodiment.

FIG. 13 shows the third embodiment. In the third embodiment, the first embodiment is modified as follows. In the third embodiment, the gaze position is referred to as a gaze position 210. Hereinafter, the third embodiment will be described based on an example in which five gaze positions 210 are detected.

In the third embodiment, in a case where it is necessary to distinguish and describe a plurality of gaze positions 210, the plurality of gaze positions 210 are referred to as a gaze position 210A, a gaze position 210B, a gaze position 210C, a gaze position 210D, and a gaze position 210E. In the example shown in FIG. 13, the gaze positions 210 are detected in an order of the gaze position 210A, the gaze position 210B, the gaze position 210C, the gaze position 210D, and the gaze position 210E.

The target region setting unit 110 acquires all the gaze position data stored in the RAM 46 since the target region setting processing is started, and determines whether the target region 206 (refer to FIG. 14) can be set based on the plurality of gaze positions 210 indicated by the acquired gaze position data. For example, as in the example shown in FIG. 13, the target region setting unit 110 determines that the target region 206 can be set based on the plurality of gaze positions 210 in a case where the target region 206 can be set based on the gaze position 210B, the gaze position 210C, the gaze position 210D, and an intersection position 214 as a position at which a line 212A connecting two gaze positions 210A and 210B and a line 212B connecting two gaze positions 210D and 210E intersect is set as the intersection position 214 in a case where three or more gaze positions 210 are detected. The target region setting unit 110 sets a position at which the lines 212A and 212B connecting two gaze positions 210 intersect with each other as the intersection position 214 in a case of determining that the target region 206 can be set based on the plurality of gaze positions 210.

Figure 14:
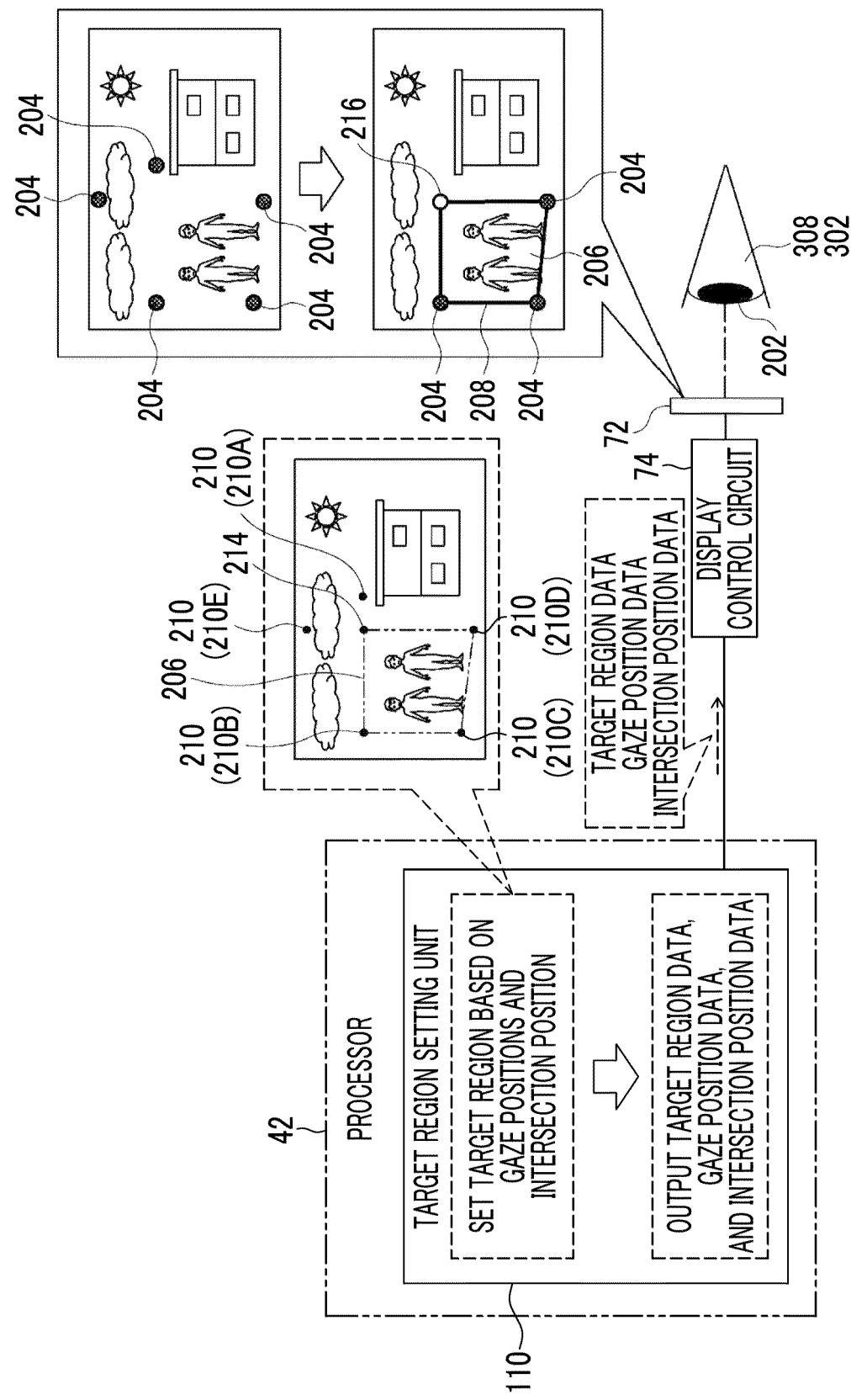
FIG. 14 is an explanatory diagram showing an example of a second operation of the processor according to the third embodiment.

Subsequently, as shown in FIG. 14 as an example, the target region setting unit 110 sets the target region 206 based on the gaze position 210B, the gaze position 210C, the gaze position 210D, and the intersection position 214 that are present at positions capable of defining the target region 206. That is, a closed region defined by connecting the gaze position 210B, the gaze position 210C, the gaze position 210D, and the intersection position 214 is set as the target region 206 for the captured image 200. As described above, in a case where the target region 206 having four vertices is set, at least 4+1 gaze positions 210 are used.

Then, the target region setting unit 110 outputs the target region data including the target region frame 208 that is a mark indicating the target region 206 on the captured image 200 to the display 72. Further, the target region setting unit 110 outputs the gaze position data including the gaze position marks 204 that are marks indicating the gaze positions 210 defining the target region 206 on the captured image 200 and intersection position data including an intersection position mark 216 that is a mark indicating the intersection position 214 on the captured image 200 to the display 72. The display 72 superimposes and displays the gaze position mark 204, the intersection position mark 216, and the target region frame 208 on the captured image 200 based on the gaze position data, the intersection position data, and the target region data. Accordingly, instead of the plurality of gaze position marks 204 displayed on the display 72 corresponding to the five gaze positions 210, the gaze position marks 204, the intersection position mark 216, and the target region frame 208 that define the target region 206 are displayed.

In the third embodiment, in a case where three or more gaze positions 210 are detected, the processor 42 sets a position at which lines 212A and 221B connecting two gaze positions 210 intersect with each other as the intersection position 214, and sets the target region 206 based on the gaze positions 210 and the intersection position 214 present at positions capable of defining the target region 206. Therefore, even in a case where the lines 212A and 212B connecting two gaze positions 210 are generated in a process of setting the target region 206, it is possible to set the target region 206 that is a closed region.

In the third embodiment, the target region 206 is set based on five gaze positions 210, but may be set based on four gaze positions 210. In this case, a triangular target region 206 is set. As described above, in a case where the target region 206 having three vertices is set, at least 3+1 gaze positions 210 are used. Further, the target region 206 may have a shape having n vertices. n is a natural number. When the target region 206 having n vertices is set, at least 4+1 gaze positions 210 are used.

Fourth Embodiment

Next, a fourth embodiment will be described.

Figure 15:
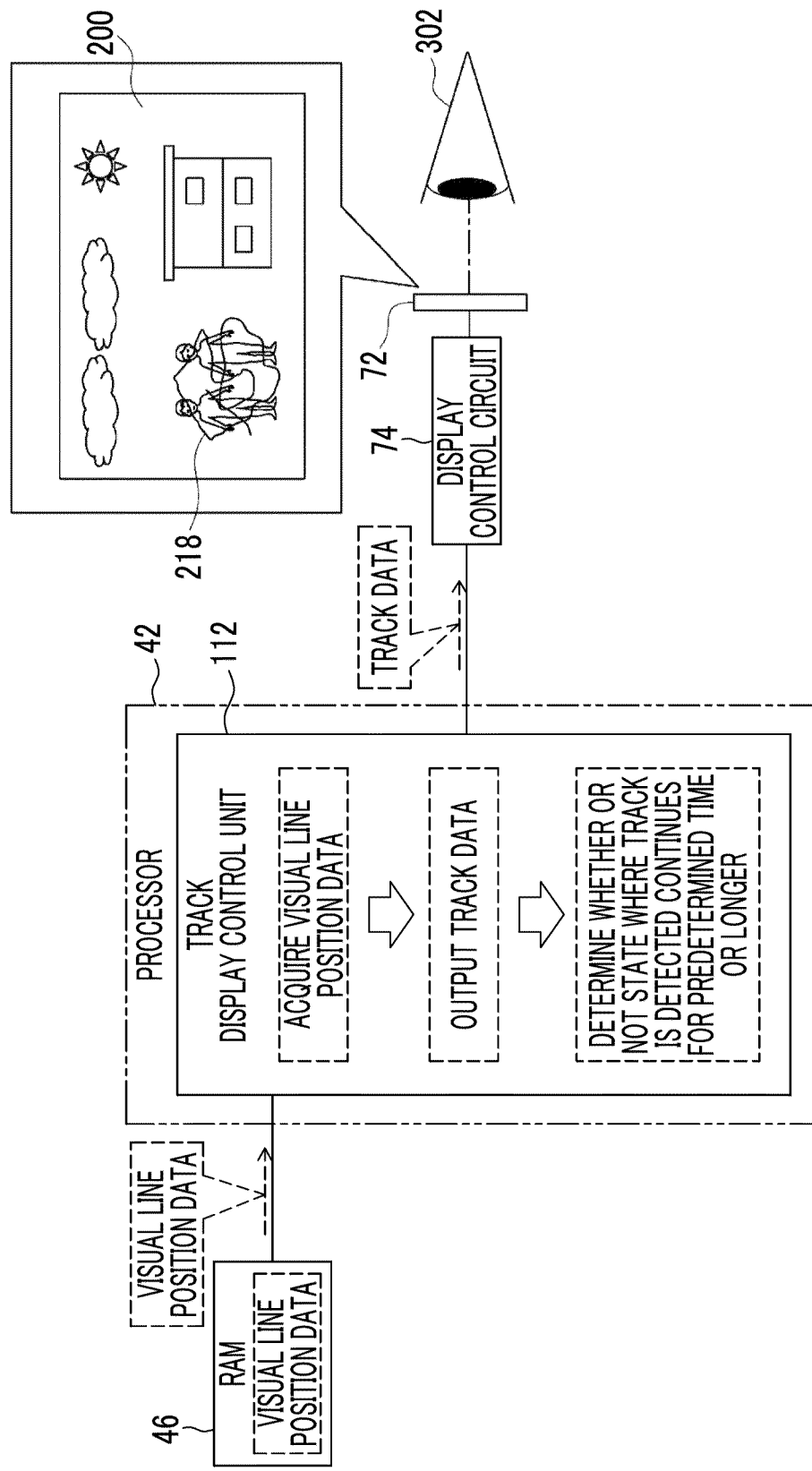
FIG. 15 is an explanatory diagram showing an example of a first operation of a processor according to a fourth embodiment.
Figure 16:
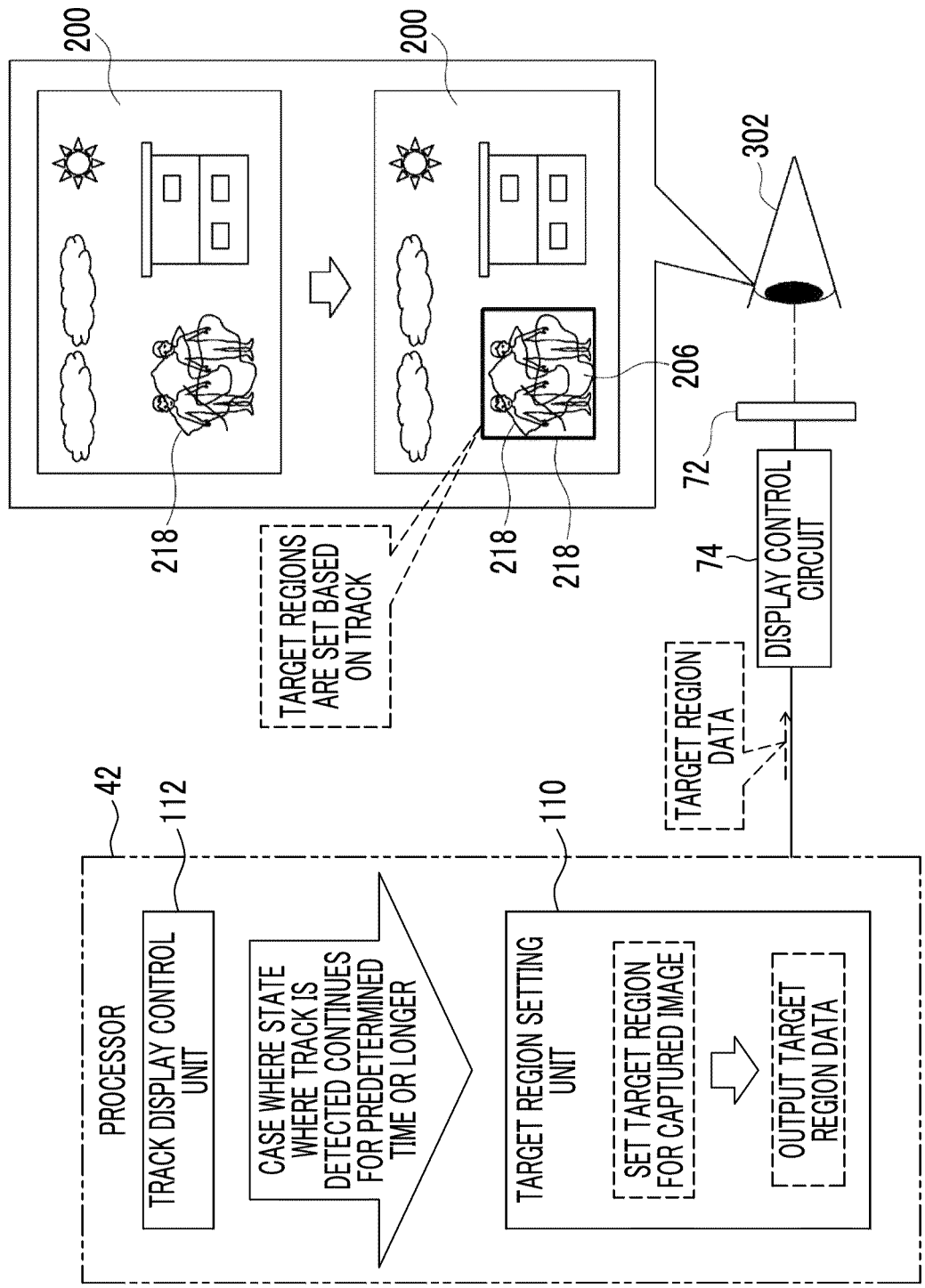
FIG. 16 is an explanatory diagram showing an example of a second operation of the processor according to the fourth embodiment.

FIGS. 15 and 16 show the fourth embodiment. In the fourth embodiment, the first embodiment is modified as follows.

As shown in FIG. 15 as an example, in the fourth embodiment, a CPU operates as a track display control unit 112. The track display control unit 112 causes the display 72 to display a track line 218 corresponding to the visual line position. Specifically, the track display control unit 112 performs the following processing. That is, the track display control unit 112 acquires all the visual line position data stored in the RAM 46 since the target region setting processing is started. Subsequently, the visual line position display control unit 106 detects a track defined by connecting a plurality of visual line positions in an order in which the plurality of visual line positions are detected, based on a plurality of pieces of acquired visual line position data. Then, the visual line position display control unit 106 outputs track data including the track line 218 indicating the track to the display 72. The display 72 displays the track line 218 indicated by the track data while superimposing the track line 218 on the captured image 200. In this way, the track line 218 corresponding to the visual line positions is displayed on the display 72. The track is an example of a "track" according to the technology of the present disclosure.

The track display control unit 112 determines whether or not a state where the track is detected continues for a predetermined time or longer. The predetermined time may be, for example, a time from start to end of reception of an instruction from the user through the receiving unit 94 (refer to FIG. 2). Further, the predetermined time may be a time until a predetermined time (for example, a time in which a track for setting a region can be secured) elapses from the start of the reception of the instruction from the user, or may be a time from when the user starts to direct a visual line to the display 72 until the user removes the visual line from the display 72. The predetermined time is an example of a "second time" according to the technology of the present disclosure.

The track display control unit 112 executes again the above-described processing of acquiring the captured image data (refer to FIG. 5), the above-described processing of acquiring the visual line data (refer to FIG. 6), and the above-described processing of outputting the track data in a case of determining that a state where the track is detected does not continue for the predetermined time or longer. Accordingly, in a case where a state where the track is detected does not continue for the predetermined time or longer, the track data is repeatedly output to the display 72. As described above, until the predetermined time is reached, the track along which the visual line position has varied is detected, and the track data including the track line 218 that is a line indicating the detected track is output to the display 72. In the fourth embodiment, the captured image data is an example of "second image data" according to the technology of the present disclosure. The captured image 200 indicated by the captured image data is an example of a "second image" according to the technology of the present disclosure.

As shown in FIG. 16 as an example, the target region setting unit 110 sets a target region 206 for the captured image 200 based on the detected track. Specifically, the target region setting unit 110 performs the following processing. That is, the target region setting unit 110 sets a closed region surrounding the track indicated by the track line 218 as the target region 206 for the captured image 200 in a case where the track display control unit 112 determines that a state the track is detected continues for the predetermined time or longer. In this case, the target region setting unit 110 may set a closed region circumscribing the track as the target region 206 for the captured image 200, or may set a closed region surrounding the track away from the track as the target region 206 for the captured image 200. In this way, the target region 206 is set for the captured image 200 based on the track. The target region 206 is an example of a "second region" according to the technology of the present disclosure.

Then, the target region setting unit 110 outputs the target region data including the target region frame 208 that is the mark indicating the target region 206 on the captured image 200 to the display 72. The display 72 displays the target region frame 208 indicated by the target region data by superimposing the target region frame 208 on the captured image 200 and the track line 218.

Figure 17:
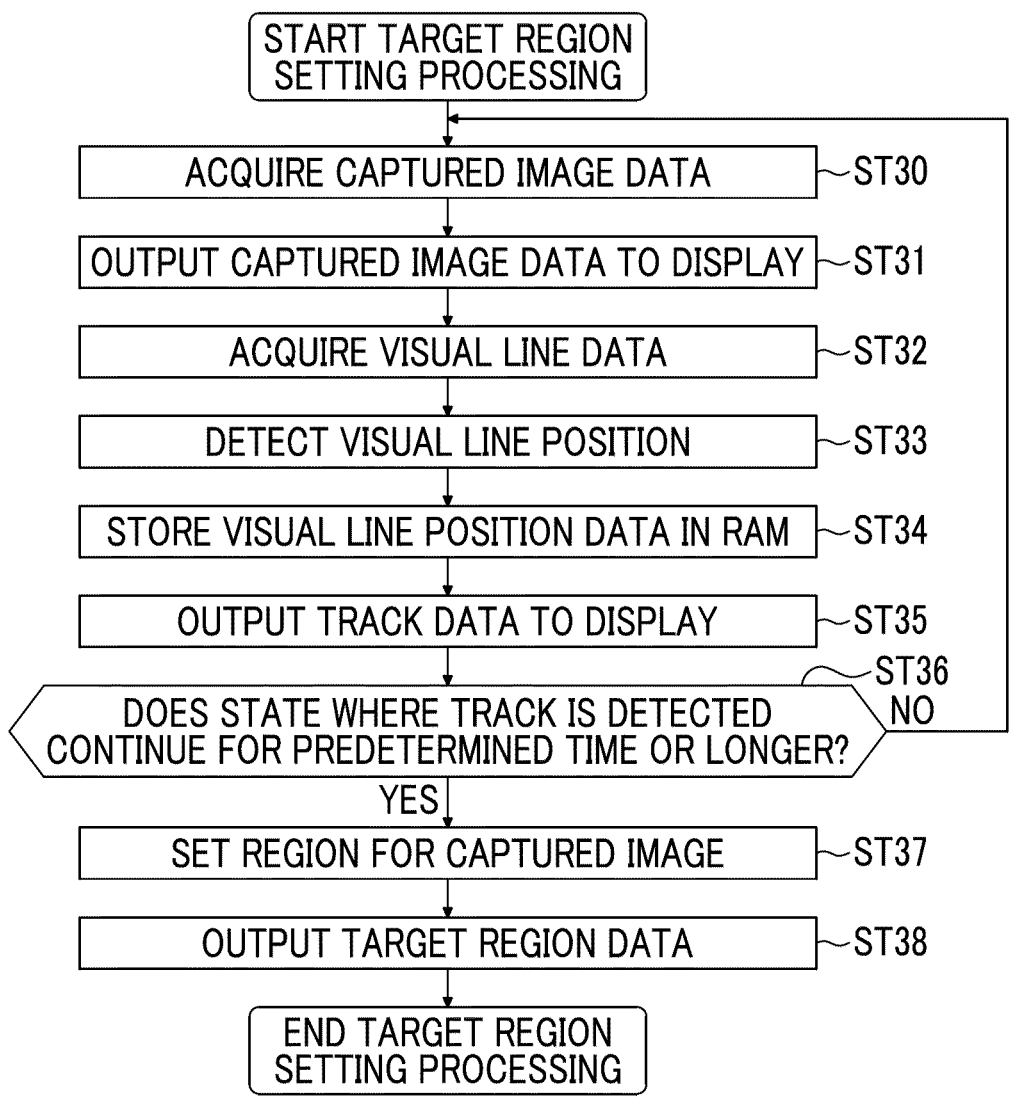
FIG. 17 is a flowchart showing an example of a flow of target region setting processing according to the fourth embodiment.

Next, an action of the imaging apparatus according to the fourth embodiment will be described with reference to FIG. 17. FIG. 17 shows an example of a flow of the target region setting processing according to the fourth embodiment.

In the target region setting processing shown in FIG. 17, the processing from step ST30 to step ST34 is the same as the processing from step ST10 to step ST14 in the target region setting processing according to the first embodiment (refer to FIG. 10). After the processing of step ST34 is executed, The target region setting processing shown in FIG. 17 transitions to step ST35.

In step ST35, the track display control unit 112 acquires all the visual line position data stored in the RAM 46 since the target region setting processing is started, and detects the track defined by connecting the plurality of visual line positions in the order in which the plurality of visual line positions are detected, based on the plurality of pieces of acquired visual line position data. Then, the visual line position display control unit 106 outputs the track data including the track line 218 that is a mark indicating the track to the display 72. Accordingly, the track line 218 indicated by the track data is displayed on the display 72 while being superimposed on the captured image 200.

In step ST36, the track display control unit 112 determines whether or not a state where the track is detected continues for the predetermined time or longer. In a case where a state where the track is detected does not continue for the predetermined time or longer in step ST36, the determination is negative and the target region setting processing transitions to step ST30. In a case where a state where the track is detected continues for the predetermined time or longer in step ST36, the determination is positive, and the target region setting processing transitions to step ST37.

In step ST37, the target region setting unit 110 sets a closed region surrounding the track detected in step ST35 as the target region 206 for the captured image 200. After the processing of step ST37 is executed, the target region setting processing transitions to step ST38.

In step ST38, the target region setting unit 110 outputs the target region data including the target region frame 208 indicating the target region 206 set in step ST37 to the display 72. Accordingly, the target region frame 208 indicated by the target region data is displayed on the display 72 while being superimposed on the captured image 200. After the processing of step ST38 is executed, the target region setting processing ends. The above-described information processing method described as the action of the imaging apparatus is an example of an "information processing method" according to the technology of the present disclosure. As described above, in the fourth embodiment, the processor 42 acquires the captured image data and outputs the captured image data to the display 72. Further, the processor 42 acquires the visual line data, and detects a track along which the visual line position has varied within the predetermined time with respect to the captured image 200 indicated by the captured image data based on the visual line data. Then, the processor 42 sets the target region 206 based on the track. Therefore, it is possible to set the target region 206 for the captured image 200 based on the track along which the visual line position has varied.

Further, the processor 42 sets a closed region surrounding the track as the target region 206 for the captured image 200. Therefore, it is possible to set the target region 206, which is a closed region surrounding the track, based on the track along which the visual line position has varied.

Figure 18:
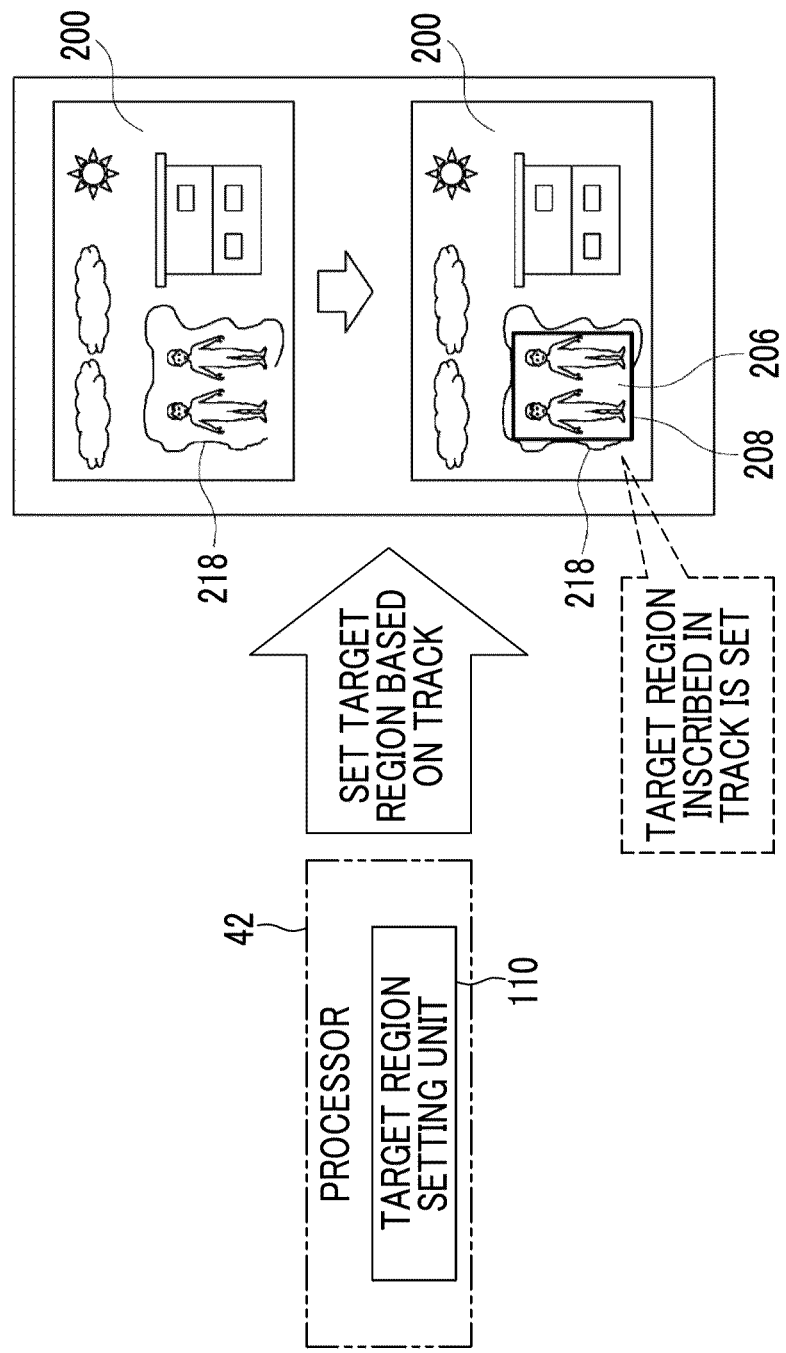
FIG. 18 is an explanatory diagram showing a first modification example of the operation of the processor according to the fourth embodiment.

As shown in FIG. 18 as an example, the target region setting unit 110 may set a closed region (for example, a rectangular region) inscribed in the track indicated by the track line 218 as the target region 206 for the captured image 200.

Figure 19:
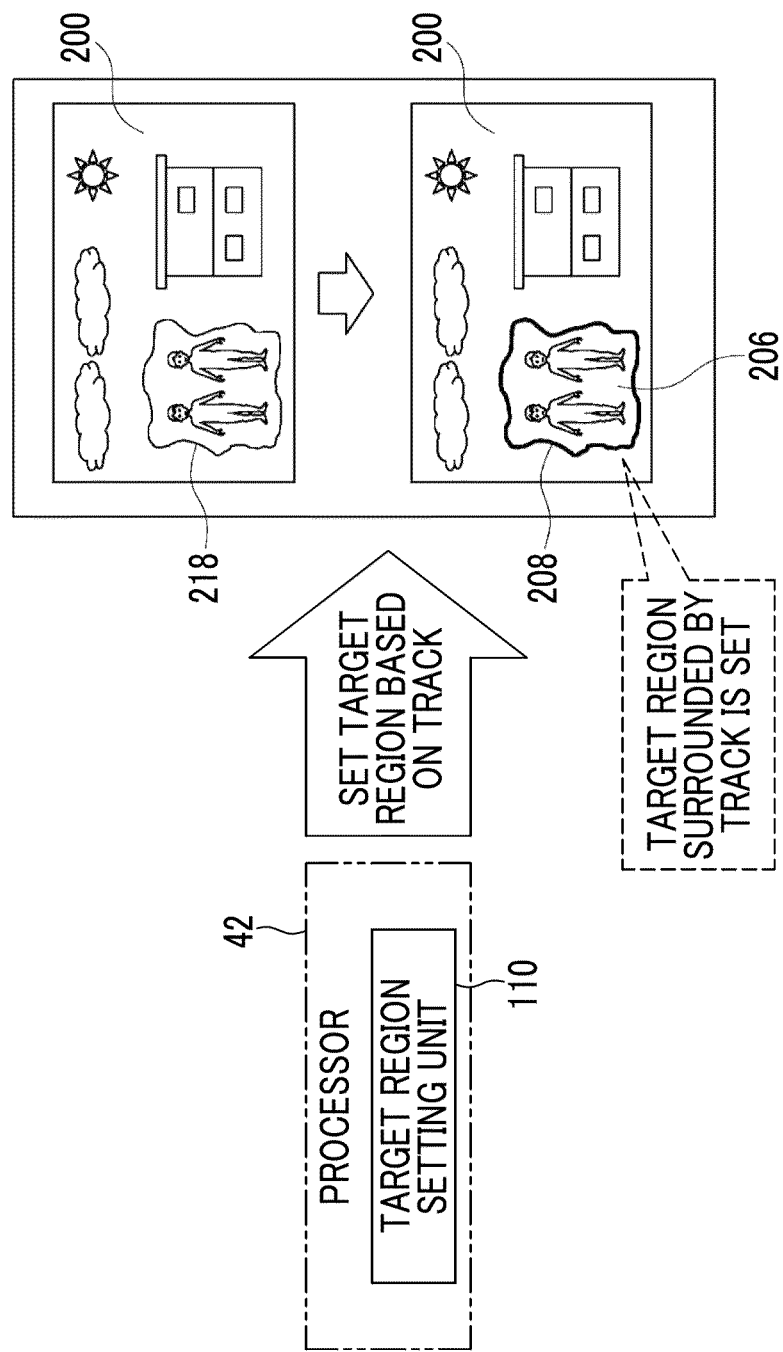
FIG. 19 is an explanatory diagram showing a second modification example of the operation of the processor according to the fourth embodiment.

Further, as shown in FIG. 19 as an example, in a case where the track indicated by the track line 218 forms a closed region, the target region setting unit 110 may set the closed region formed by the track as the target region 206 for the captured image 200. That is, a region surrounded by the track may be set as the target region 206 for the captured image 200.

Fifth Embodiment

Next, a fifth embodiment will be described.

Figure 20:
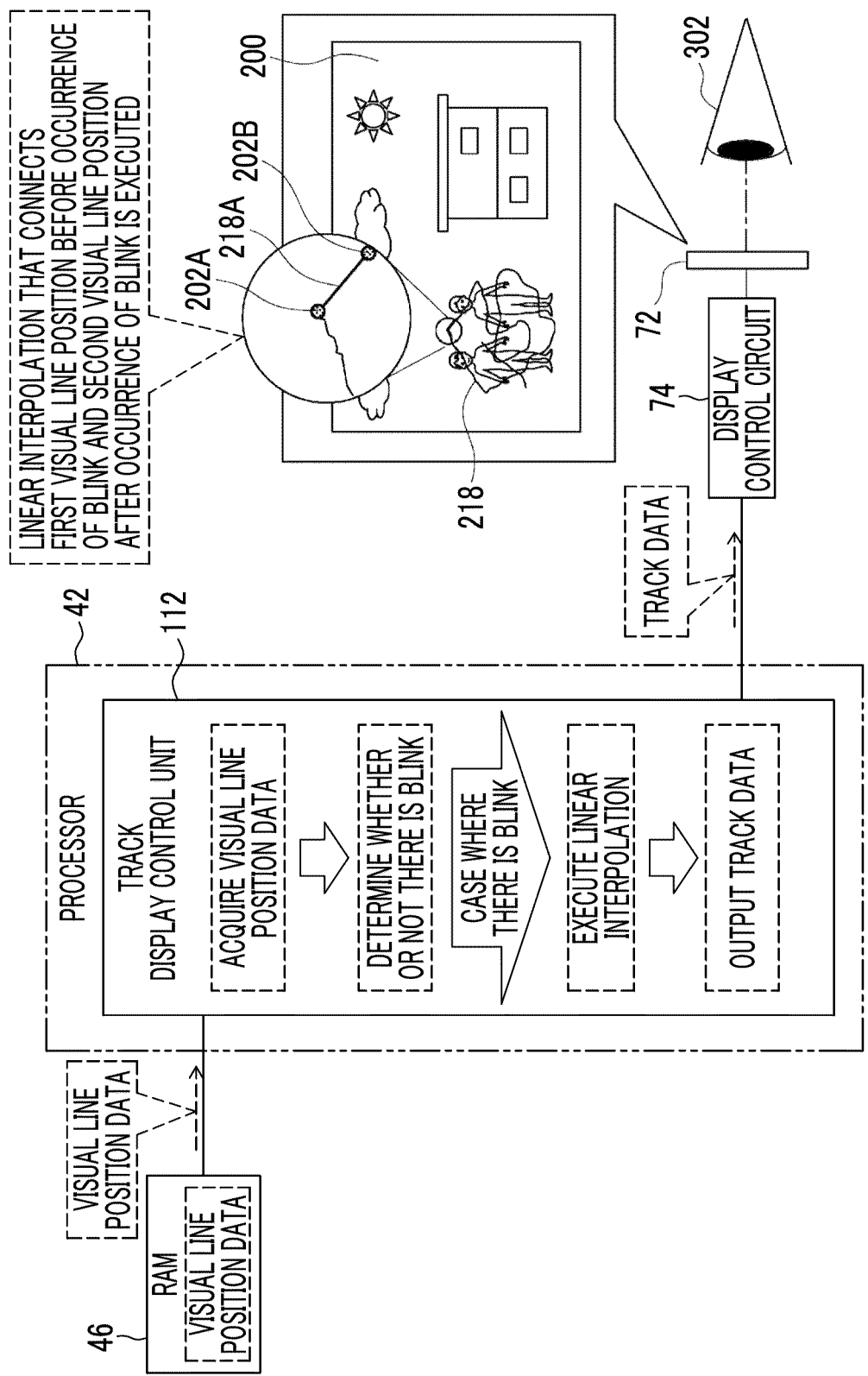
FIG. 20 is an explanatory diagram showing an example of an operation of a processor according to a fifth embodiment.

FIG. 20 shows the fifth embodiment. In the fifth embodiment, the fourth embodiment is modified as follows.

The track display control unit 112 determines whether or not a blink occurs, and outputs track data generated based on a determination result to the display 72. Specifically, the track display control unit 112 performs the following processing. That is, the track display control unit 112 determines whether or not a blink occurs within a time during which the track is being detected, based on the visual line position data stored in the RAM 46. The visual line position data stored in RAM 46 includes visual line position data acquired in a case where the eye is blinking (that is, in a case where the eye 302 is closed) in addition to visual line position data acquired in a case where the eye is not blinking (that is, in a case where the eye 302 is open).

In a case where the visual line position data acquired in a case where the eye is blinking (that is, in a case where the eye 302 is closed) is detected, the track display control unit 112 determines that a blink occurs. For example, the visual line position data acquired in a case where the eye is blinking (that is, in a case where the eye 302 is closed) may include error information indicating that the visual line position is not detected. In a case where the visual line position data acquired from the RAM includes visual line position data including error information, the track display control unit 112 determines that a blink occurs.

In a case of determining that a blink occurs, the track display control unit 112 detects a track by executing linear interpolation that connects a first visual line position before the occurrence of the blink and a second visual line position after the occurrence of the blink based on the visual line position data acquired before and after the visual line position data in a case of blinking That is, the track display control unit 112 detects the track based on the line connecting the first visual line position before the occurrence of the blink and the second visual line position after the occurrence of the blink. Then, the track display control unit 112 outputs track data indicating the track to the display 72. In this way, the track data generated based on the result of determining whether or not a blink occurs is output to the display 72. The display 72 displays the track line 218 indicated by the track data while superimposing the track line 218 on the captured image 200.

As shown in FIG. 20 as an example, a first visual line position mark 202A indicating the first visual line position, a second visual line position mark 202B indicating the second visual line position, and an interpolation line 218A indicating a line connecting the first visual line position and the second visual line position may be displayed while being superimposed on the captured image 200. Further, in a case where the first visual line position and the second visual line position are separated from each other to such an extent that linear interpolation cannot be performed, the track display control unit 112 may cause the display 72 to display text or the like indicating an error.

Figure 21:
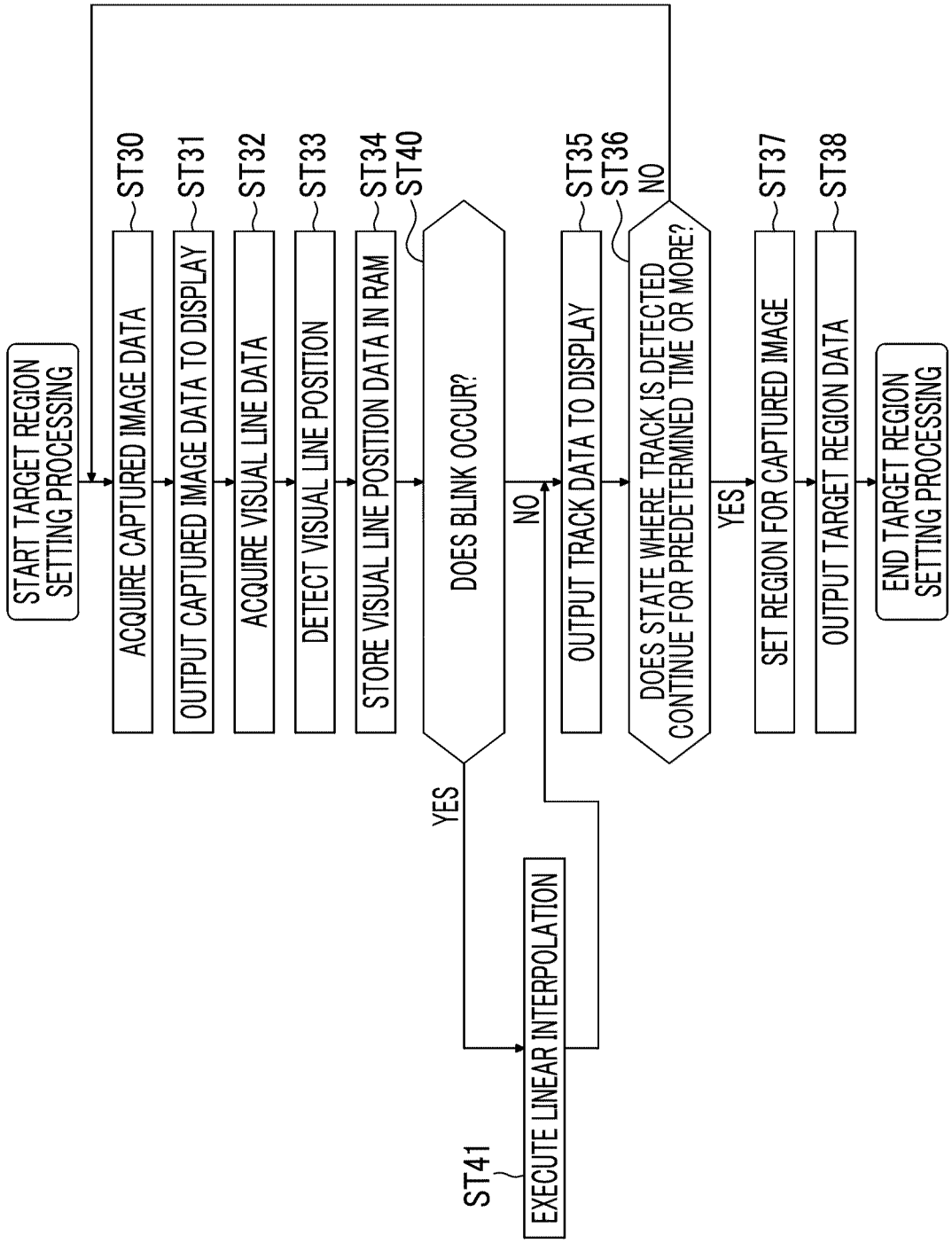
FIG. 21 is a flowchart showing an example of a flow of target region setting processing according to the fifth embodiment.

Next, an action of the imaging apparatus according to the fifth embodiment will be described with reference to FIG. 21. FIG. 21 shows an example of a flow of the target region setting processing according to the fifth embodiment.

In the target region setting processing shown in FIG. 21, processing from step ST40 to step ST41 is added to the target region setting processing according to the fourth embodiment (refer to FIG. 17). The processing from step ST30 to step ST34 is the same as the target region setting processing according to the fourth embodiment. After the processing of step ST34 is executed, the target region setting processing shown in FIG. 17 transitions to step ST40.

In step ST40, the track display control unit 112 determines whether or not a blink occurs within the time during which the track is being detected, based on the visual line position data acquired in step ST34. In a case where a blink does not occur within the time during which the track is being detected in step ST40, the determination is negative and the target region setting processing transitions to step ST35. In a case where a blink occurs within a time during which the track is being detected in step ST40, the determination is positive and the target region setting processing transitions to step ST41.

In a case of determining in step ST41 that a blink occurs, the track display control unit 112 detects a track by performing linear interpolation between the first visual line position before the occurrence of the blink and the second visual line position after the occurrence of the blink based on visual line position data acquired before and after the visual line position data in the case of blinking. The processing from step ST35 to step ST38 is the same as the target region setting processing according to the fourth embodiment.

As described above, in the fifth embodiment, the processor 42 determines whether or not a blink occurs within time during which the track is being detected based on the visual line position data obtained from the visual line data.

In a case of determining that a blink occurs, the processor 42 detects a track based on the line connecting the first visual line position before the occurrence of the blink and the second visual line position after the occurrence of the blink. Accordingly, even in a case where a blink occurs, it is possible to set the target region 206 based on the track.

Sixth Embodiment

Next, a sixth embodiment will be described.

FIG. 22 to FIG. 25 show the sixth embodiment. In the sixth embodiment, the first embodiment is modified as follows.

Figure 22:
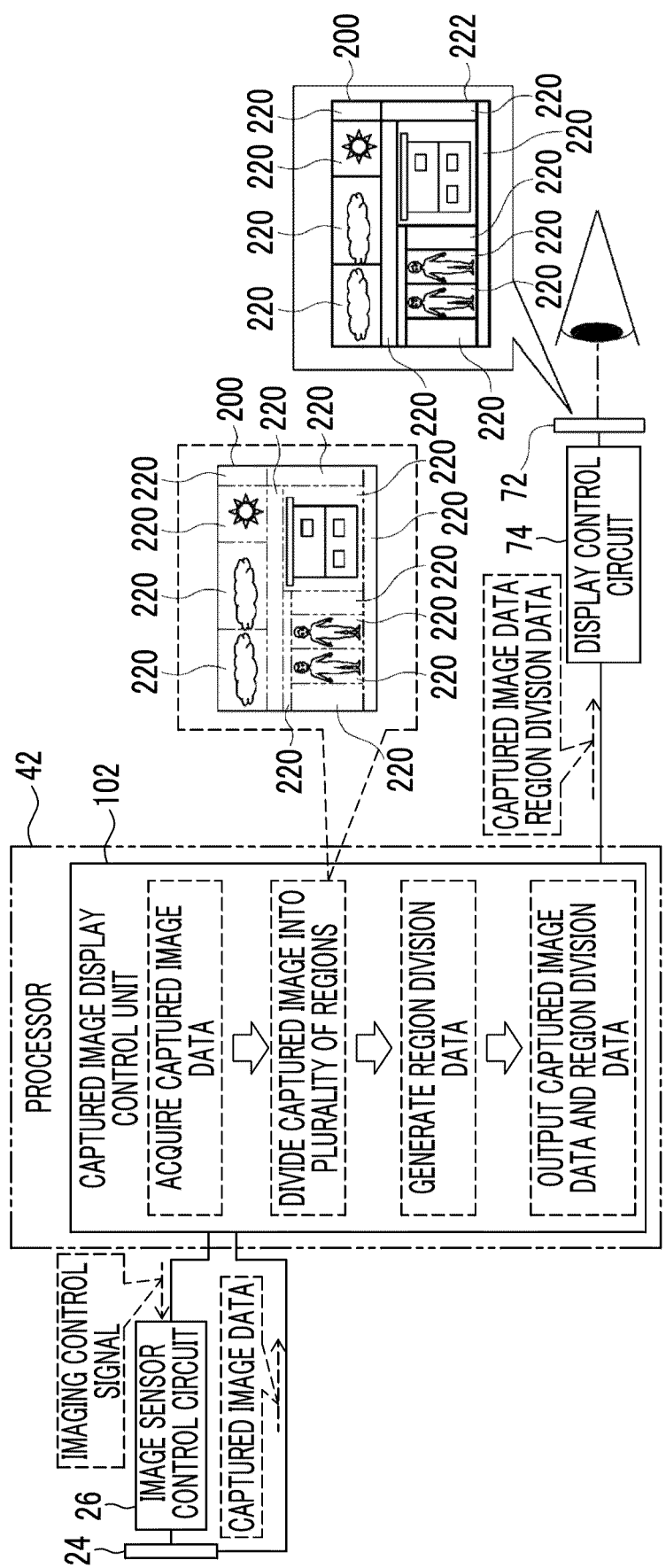
FIG. 22 is an explanatory diagram showing an example of a first operation of a processor according to a sixth embodiment.

As shown in FIG. 22 as an example, the captured image display control unit 102 causes the display 72 to display a division grid 222 that divides the captured image 200 into a plurality of regions 220. Specifically, the captured image display control unit 102 performs the following processing. That is, the captured image display control unit 102 causes the image sensor 24 to image the subject (not shown) through the image sensor control circuit 26 by outputting the imaging control signal to the image sensor control circuit 26. The captured image display control unit 102 acquires captured image data obtained by imaging the subject with the image sensor 24.

Subsequently, the captured image display control unit 102 divides the captured image 200 into the plurality of regions 220. In this case, the captured image display control unit 102 may divide the captured image 200 into the plurality of regions 220 according to an instruction from the user received by the receiving unit 94 (refer to FIG. 2), or may divide the captured image 200 into the plurality of regions 220 based on a result of performing image processing on the captured image data. Further, the captured image display control unit 102 may divide the captured image 200 into a plurality of regions 220 based on information relating to a depth of field or the like obtained from the captured image data. The plurality of regions 220 are an example of a "plurality of regions" according to the technology of the present disclosure.

Then, the captured image display control unit 102 generates region division data indicating the division grid 222 that divides the captured image 200 into the plurality of regions 220, and outputs the captured image data and the region division data to the display 72. The display 72 displays the captured image 200 indicated by the captured image data. Accordingly, the captured image 200 in which the subject appears as an image is displayed on the display 72. Further, the display 72 displays the division grid 222 indicated by the region division data by superimposing the division grid 222 on the captured image 200. In this way, the division grid 222 that divides the captured image 200 into the plurality of regions 220 is displayed on the display 72.

Figure 23:
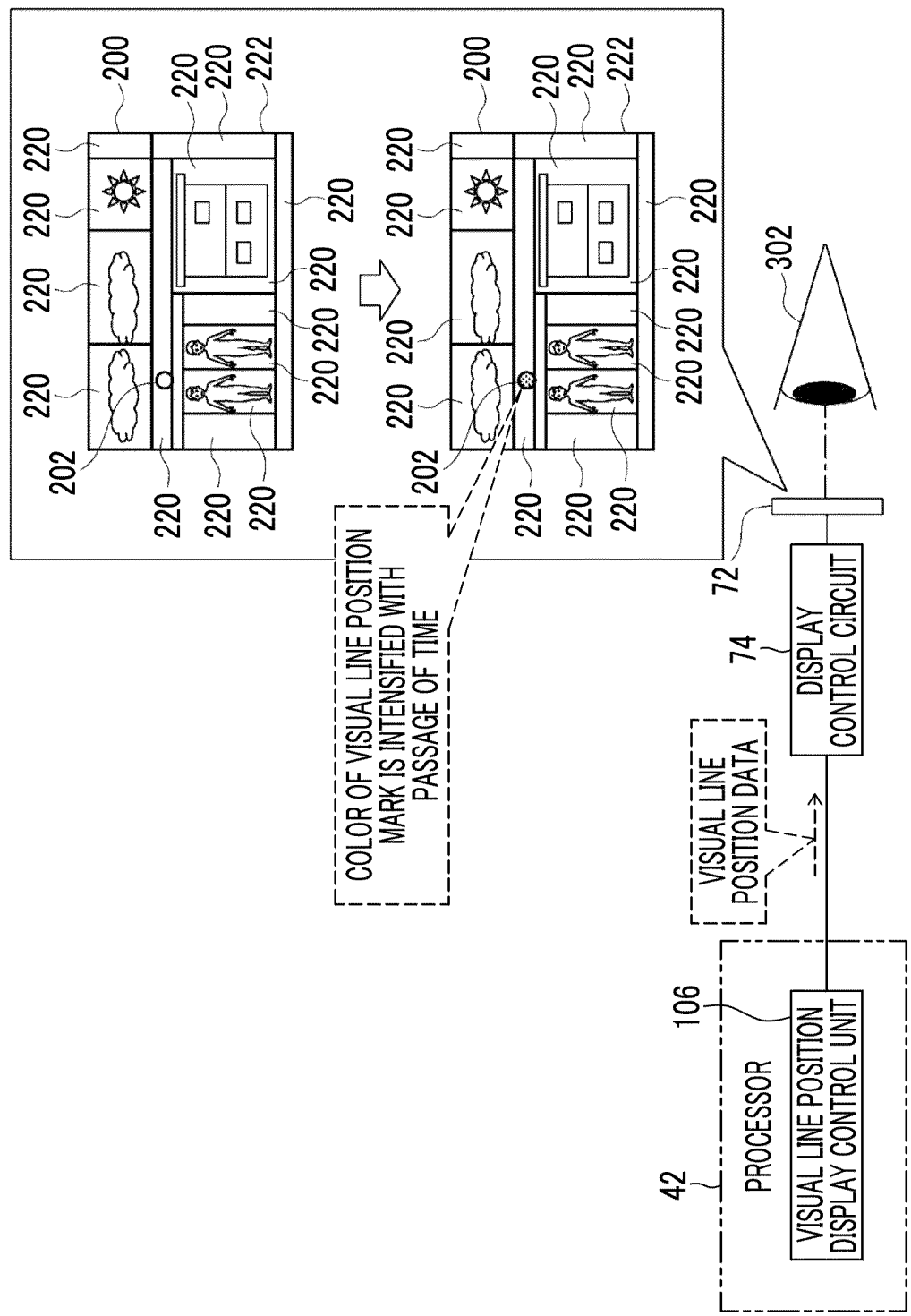
FIG. 23 is an explanatory diagram showing an example of a second operation of the processor according to the sixth embodiment.

As shown in FIG. 23 as an example, the visual line position display control unit 106 causes the display 72 to display the visual line position mark 202 corresponding to the visual line position by outputting the visual line position data to the display 72, as in the first embodiment. The visual line position display control unit 106 changes the form of the visual line position mark 202 with the passage of time in a case of repeatedly outputting the visual line position data to the display 72. For example, the visual line position display control unit 106 intensifies the color of the visual line position mark 202 with the passage of time.

Figure 24:
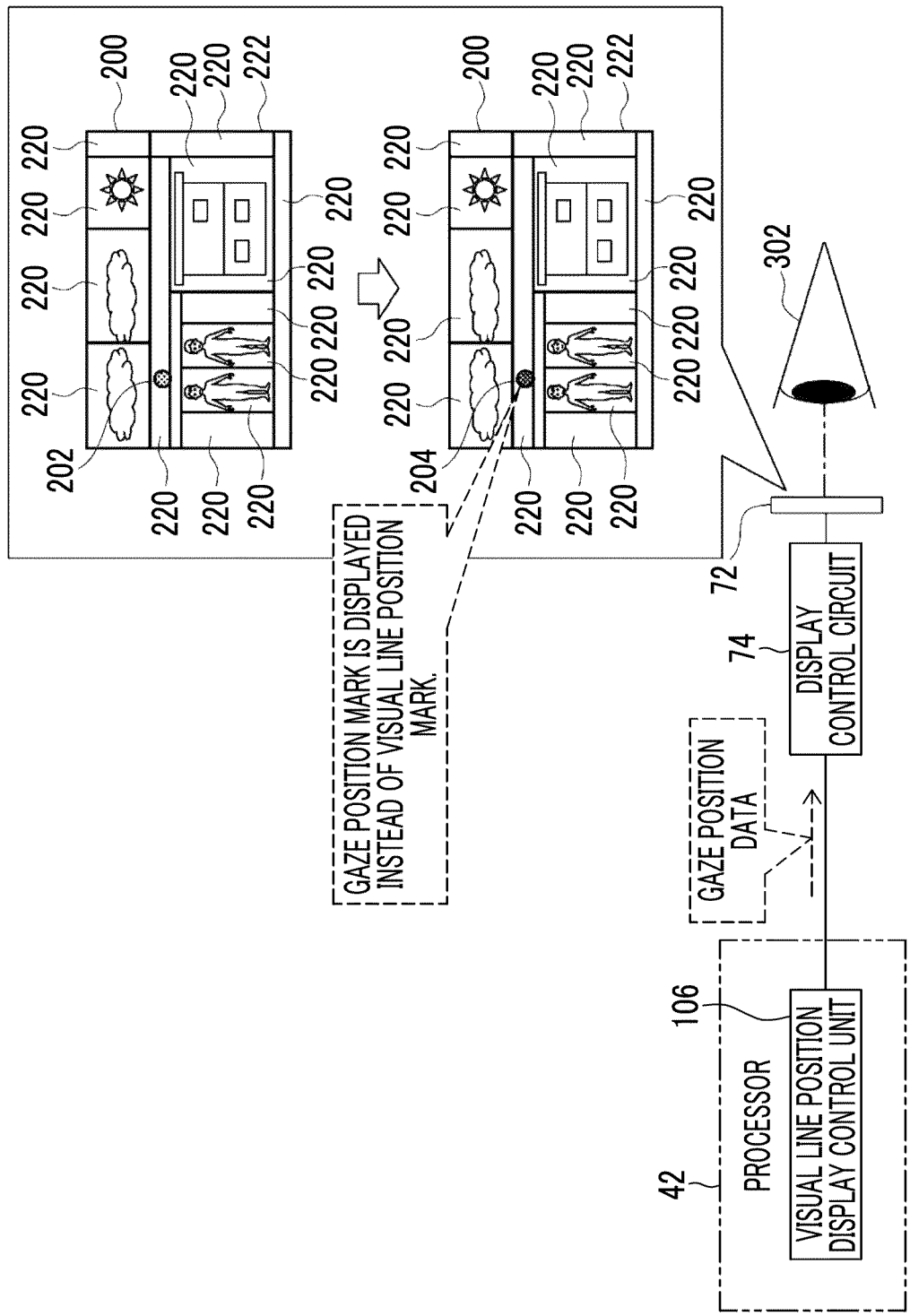
FIG. 24 is an explanatory diagram showing an example of a third operation of the processor according to the sixth embodiment.

As shown in FIG. 24 as an example, the gaze position display control unit 108 detects the visual line position as the gaze position as in the first embodiment. Then, the gaze position display control unit 108 outputs the gaze position data including the gaze position mark 204 that is the mark indicating the gaze position on the captured image 200 to the display 72, thereby causing the display 72 to display the gaze position mark 204 by superimposing the gaze position mark 204 on the captured image 200. Then, the plurality of gaze positions are detected by repeatedly executing the processing from the acquisition of the captured image data to the detection of the gaze position.

Figure 25:
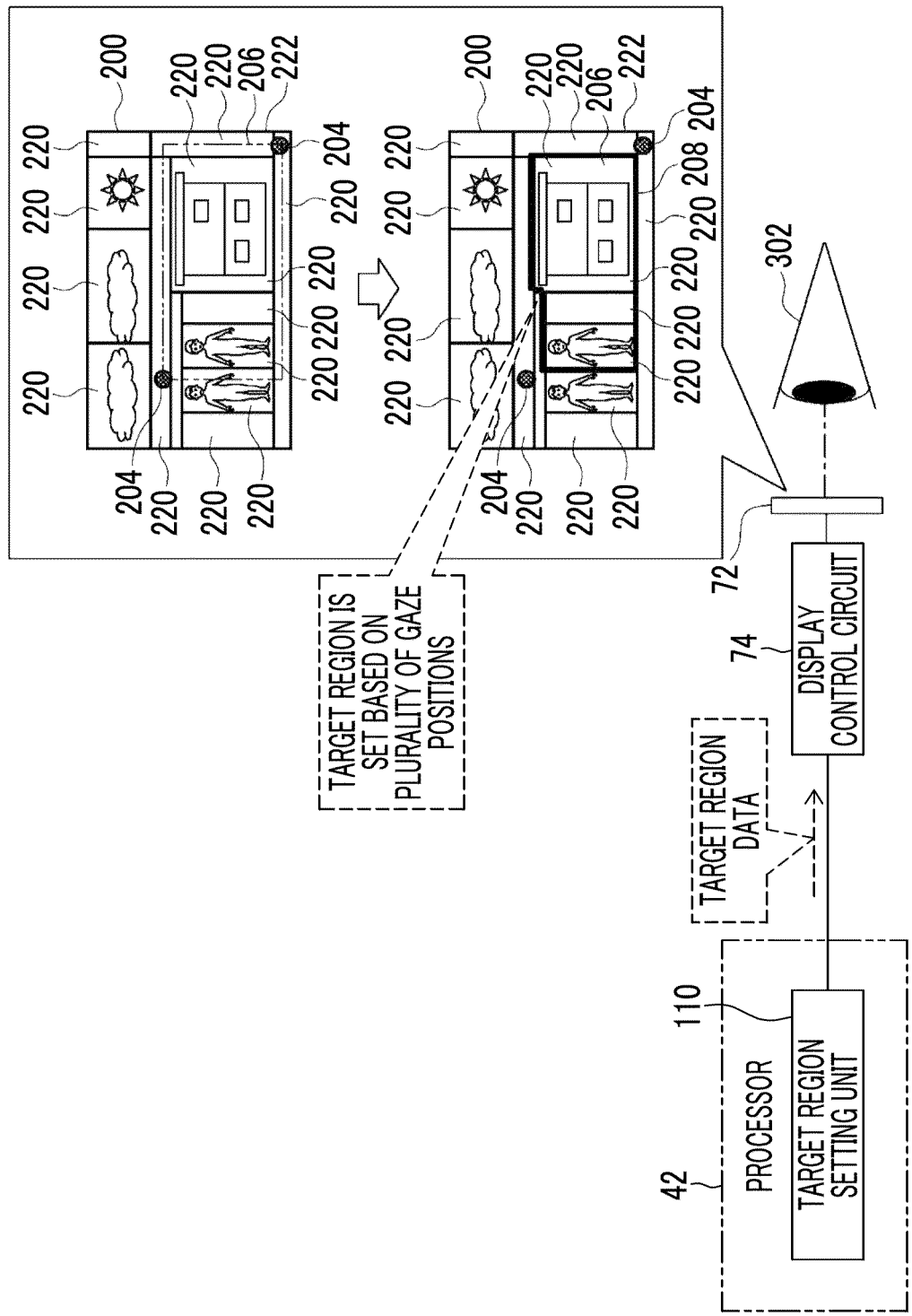
FIG. 25 is an explanatory diagram showing an example of a fourth operation of the processor according to the sixth embodiment.

FIG. 25 shows a state where two gaze positions are detected and two gaze position marks 204 are displayed on the display 72 by repeatedly executing the processing from the acquisition of the captured image data to the detection of the gaze position.

The target region setting unit 110 sets the target region 206 from the plurality of regions 220 based on the plurality of gaze positions. In this case, for example, the target region setting unit 110 extracts, from the plurality of regions 220, a region falling within a rectangular region having two gaze positions indicated by the two gaze position marks 204 as opposite corners, and sets the extracted region as the target region 206 for the captured image 200. Then, the target region setting unit 110 outputs the target region data including the target region frame 208, which is a frame indicating the target region 206, on the captured image 200 to the display 72. The display 72 displays the target region frame 208 indicated by the target region data by superimposing the target region frame 208 on the captured image 200.

Note that, in the sixth embodiment, a region is set from the plurality of regions 220 included in the captured image 200 based on two gaze positions, but a region may be set from the plurality of regions 220 included in the captured image 200 based on three or more gaze positions.

Figure 26:
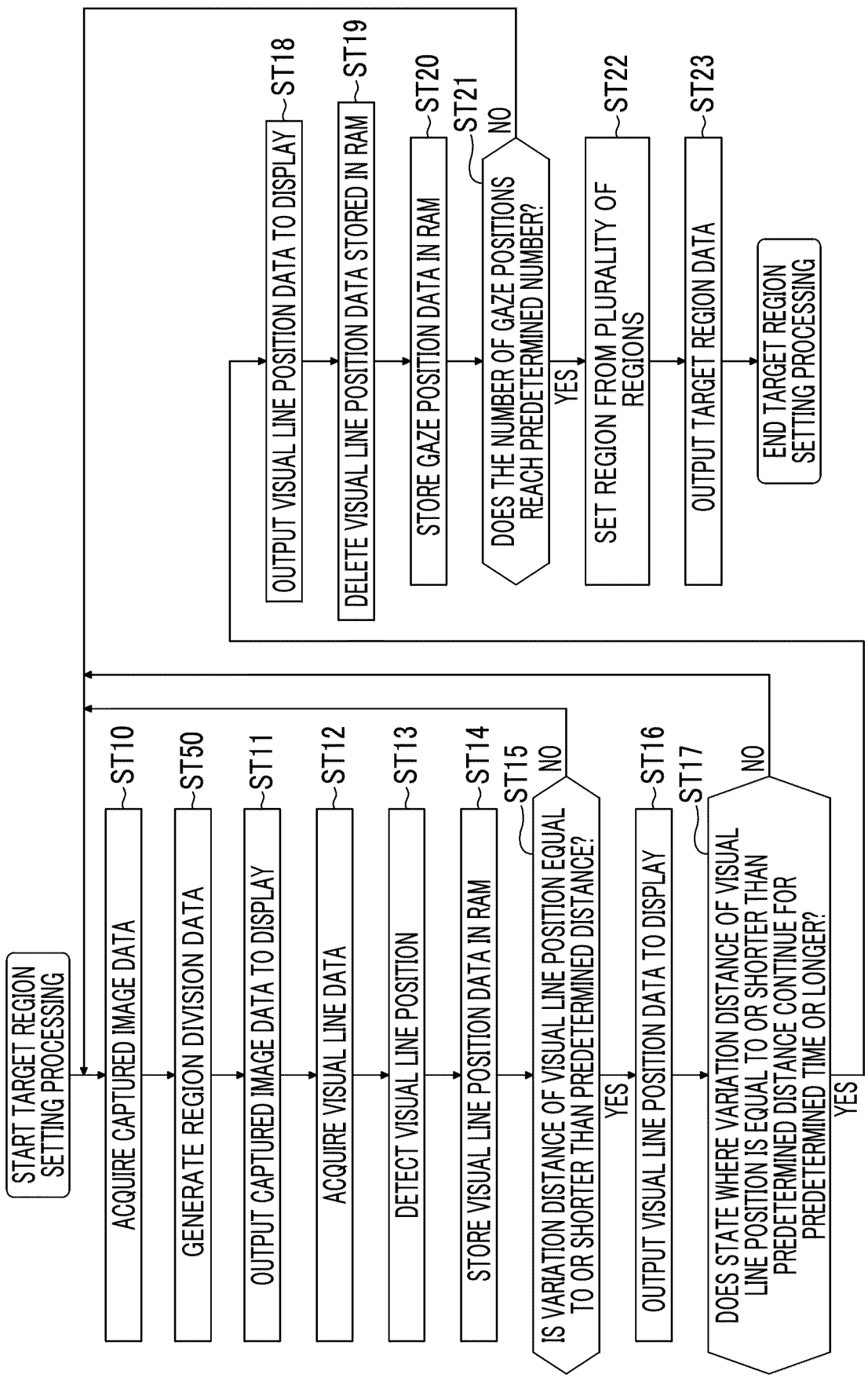
FIG. 26 is a flowchart showing an example of a flow of target region setting processing according to the sixth embodiment.

Next, an action of the imaging apparatus according to the sixth embodiment will be described with reference to FIG. 26. FIG. 26 shows an example of a flow of the target region setting processing according to the sixth embodiment.

In the target region setting processing shown in FIG. 26, a process of step ST50 is added to the target region setting processing (refer to FIG. 10) according to the first embodiment. After the processing of step ST10 is executed, the target region setting processing shown in FIG. 27 transitions to step ST50.

In step ST50, the captured image display control unit 102 generates region division data indicating the division grid 222 that divides the captured image 200 into the plurality of regions 220. After the processing of step ST50 is executed, the target region setting processing transitions to step ST11.

In step ST11, the captured image display control unit 102 outputs the captured image data acquired in step ST10 and the region division data generated in step ST50 to the display 72. Accordingly, the captured image 200 indicated by the captured image data is displayed on the display 72. Further, the division grid 222 indicated by the region division data is displayed on the display 72 while being superimposed on the captured image 200. After the processing of step ST11 is executed, the target region setting processing transitions to step ST12.

The processing from step ST12 to step ST21 is the same as the target region setting processing according to the first embodiment.

In step ST22, the target region setting unit 110 sets the target region 206 from the plurality of regions 220 based on the plurality of gaze positions indicated by the plurality of pieces of gaze position data stored in the RAM 46 in step ST20. After the processing of step ST22 is executed, the target region setting processing transitions to step ST23.

The processing of step ST23 is the same as the target region setting processing according to the first embodiment.

As described above, in the fifth embodiment, the processor 42 sets the target region 206 from the plurality of regions 220 included in the captured image 200 based on two or more gaze positions. Therefore, it is possible to set the target region 206 on the captured image 200 based on the visual line position.

Note that the target region setting unit 110 may extract, from the plurality of regions 220, a region that falls within a circular region having a line connecting the two gaze positions as a diameter, and set the extracted region 220 as the target region 206. Further, the target region setting unit 110 may extract, from the plurality of regions 220, a region that falls within a closed region defined by connecting the plurality of gaze positions in the order in which the plurality of gaze positions are detected, and set the extracted region 220 as the target region 206.

Seventh Embodiment

Next, a seventh embodiment will be described.

Figure 27:
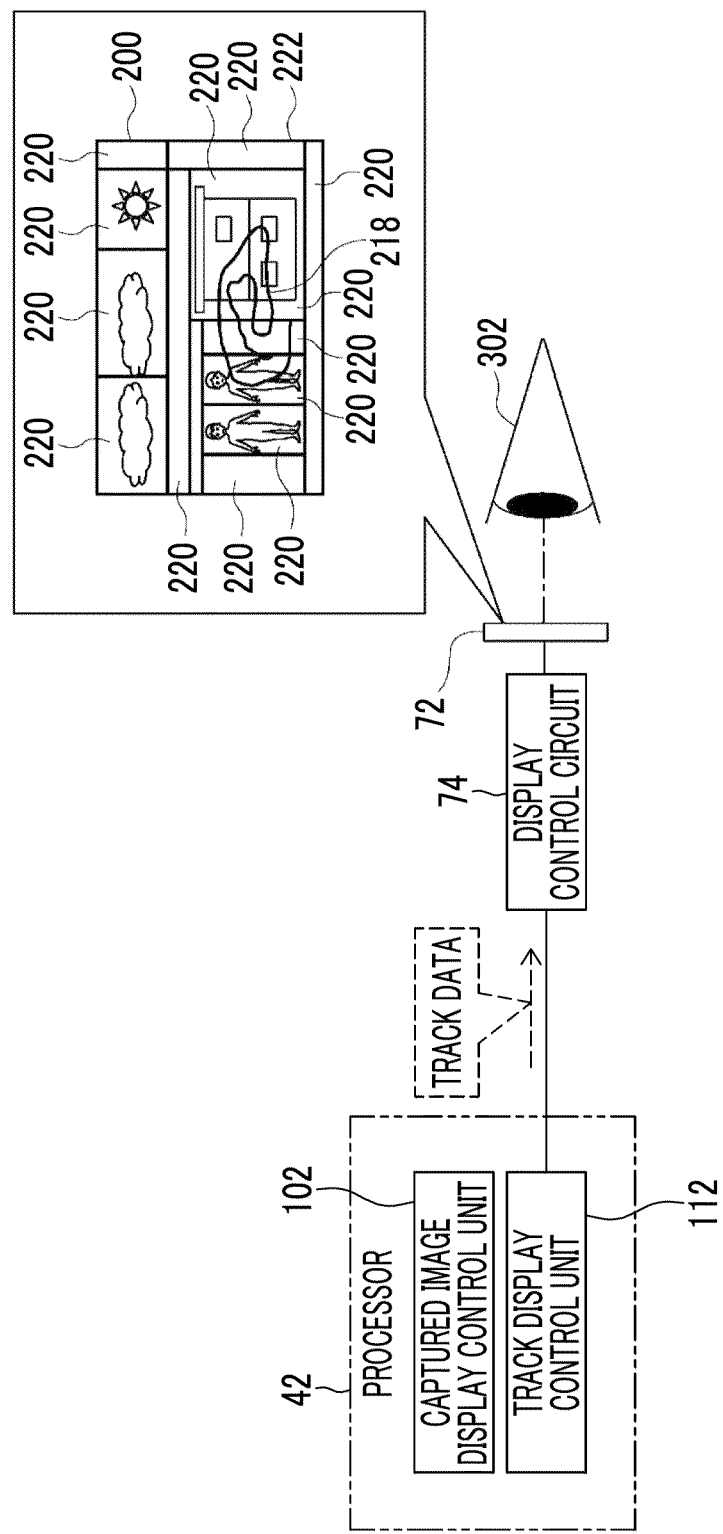
FIG. 27 is an explanatory diagram showing an example of a first operation of a processor according to a seventh embodiment.
Figure 28:
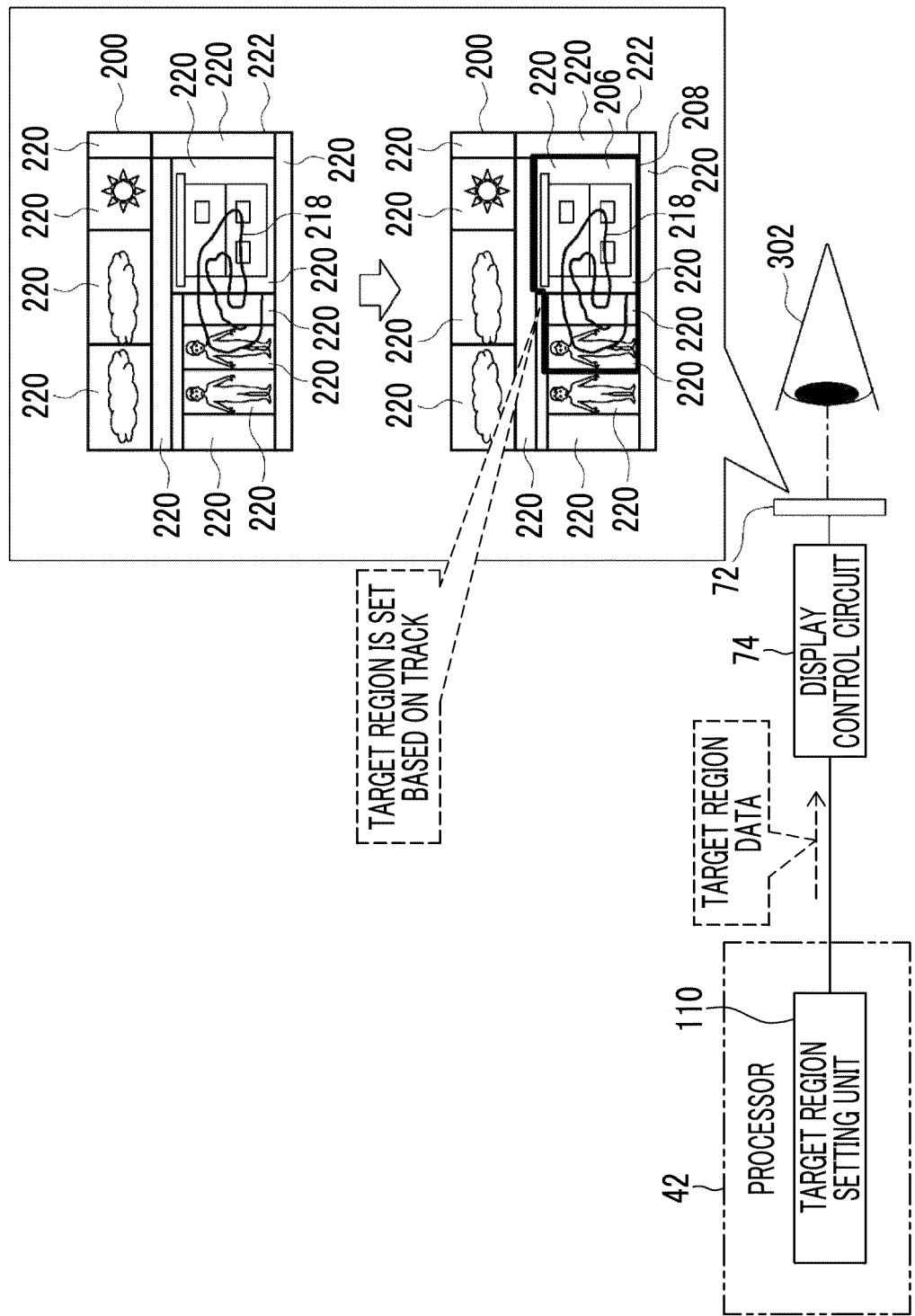
FIG. 28 is an explanatory diagram showing an example of a second operation of the processor according to the seventh embodiment.

FIGS. 27 and 28 show the seventh embodiment. In the seventh embodiment, the fourth embodiment is modified as follows.

As shown in FIG. 27 as an example, the captured image display control unit 102 causes the display 72 to display a division grid 222 that divides the captured image 200 into the plurality of regions 220, as in the sixth embodiment. Similarly to the fourth embodiment, the track display control unit 112 outputs the track data including the track line 218, which is a line indicating the track, to the display 72, thereby displaying the track line 218 indicated by the track data by superimposing the track line 218 on the captured image 200.

As shown in FIG. 28 as an example, the target region setting unit 110 sets the target region 206 from the plurality of regions 220 based on the track indicated by the track line 218. In this case, for example, the target region setting unit 110 extracts the region 220 overlapping with the track from the plurality of regions 220 and sets the extracted region 220 as the target region 206 for the captured image 200.

Then, the target region setting unit 110 outputs the target region data including the target region frame 208, which is a frame indicating the target region 206, on the captured image 200 to the display 72. The display 72 displays the target region frame 208 indicated by the target region data by superimposing the target region frame 208 on the captured image 200.

Figure 29:
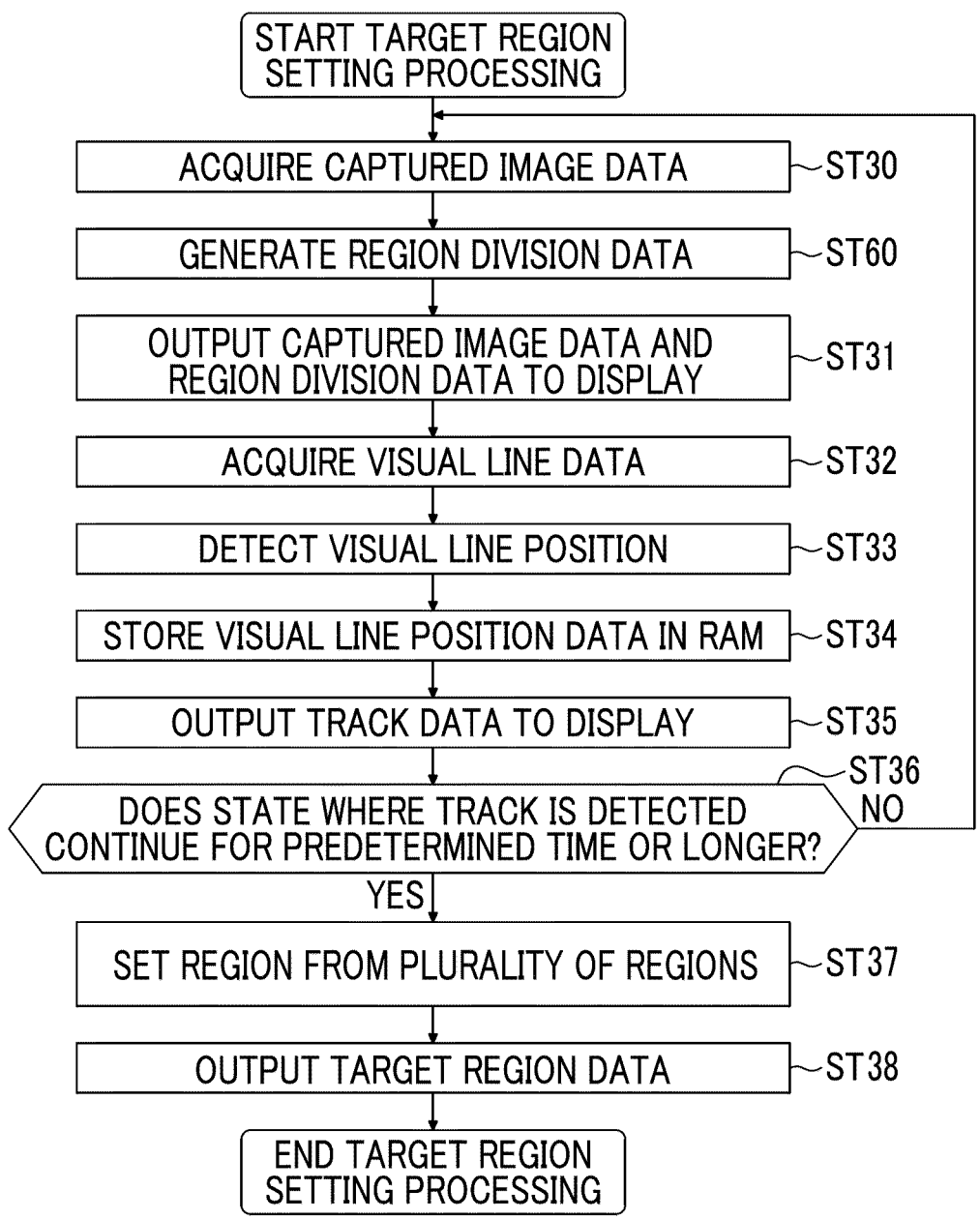
FIG. 29 is a flowchart showing an example of a flow of target region setting processing according to the seventh embodiment.

Next, an action of the imaging apparatus according to the seventh embodiment will be described with reference to FIG. 29. FIG. 29 shows an example of a flow of the target region setting processing according to the seventh embodiment.

In the target region setting processing shown in FIG. 29, processing of step ST60 is added to the target region setting processing (refer to FIG. 17) according to the fourth embodiment. After the processing of step ST30 is executed, the target region setting processing shown in FIG. 29 transitions to step ST60.

In step ST60, the captured image display control unit 102 generates the region division data indicating the division grid 222 that divides the captured image 200 into the plurality of regions 220. After the processing of step ST60 is executed, the target region setting processing transitions to step ST31.

In step ST31, the captured image display control unit 102 outputs the captured image data acquired in step ST30 and the region division data generated in step ST60 to the display 72. Accordingly, the captured image 200 indicated by the captured image data is displayed on the display 72. Further, the division grid 222 indicated by the region division data is displayed on the display 72 while being superimposed on the captured image 200. After the processing of step ST31 is executed, the target region setting processing transitions to step ST32. The processing from step ST32 to step ST36 is the same as the target region setting processing according to the fourth embodiment.

In step ST37, the target region setting unit 110 sets the target region 206 from the plurality of regions 220 based on the track detected in step ST35. After the processing of step ST37 is executed, the target region setting processing transitions to step ST38.

The processing of step ST38 is the same as the target region setting processing according to the fourth embodiment.

As described above, in the seventh embodiment, the processor 42 sets the target region 206 from the plurality of regions 220 included in the captured image 200 based on the track. Therefore, it is possible to set the target region 206 for the captured image 200 based on the track detected in accordance with the variation of the visual line position.

Note that the target region setting unit 110 may extract a region surrounding the track from the plurality of regions 220 and set the extracted region 220 as the target region 206 for the captured image 200. Further, the target region setting unit 110 may extract a region surrounded by the track from the plurality of regions 220 and set the extracted region 220 as the target region 206 for the captured image 200.

Eighth Embodiment

Next, an eighth embodiment will be described.

Figure 30:
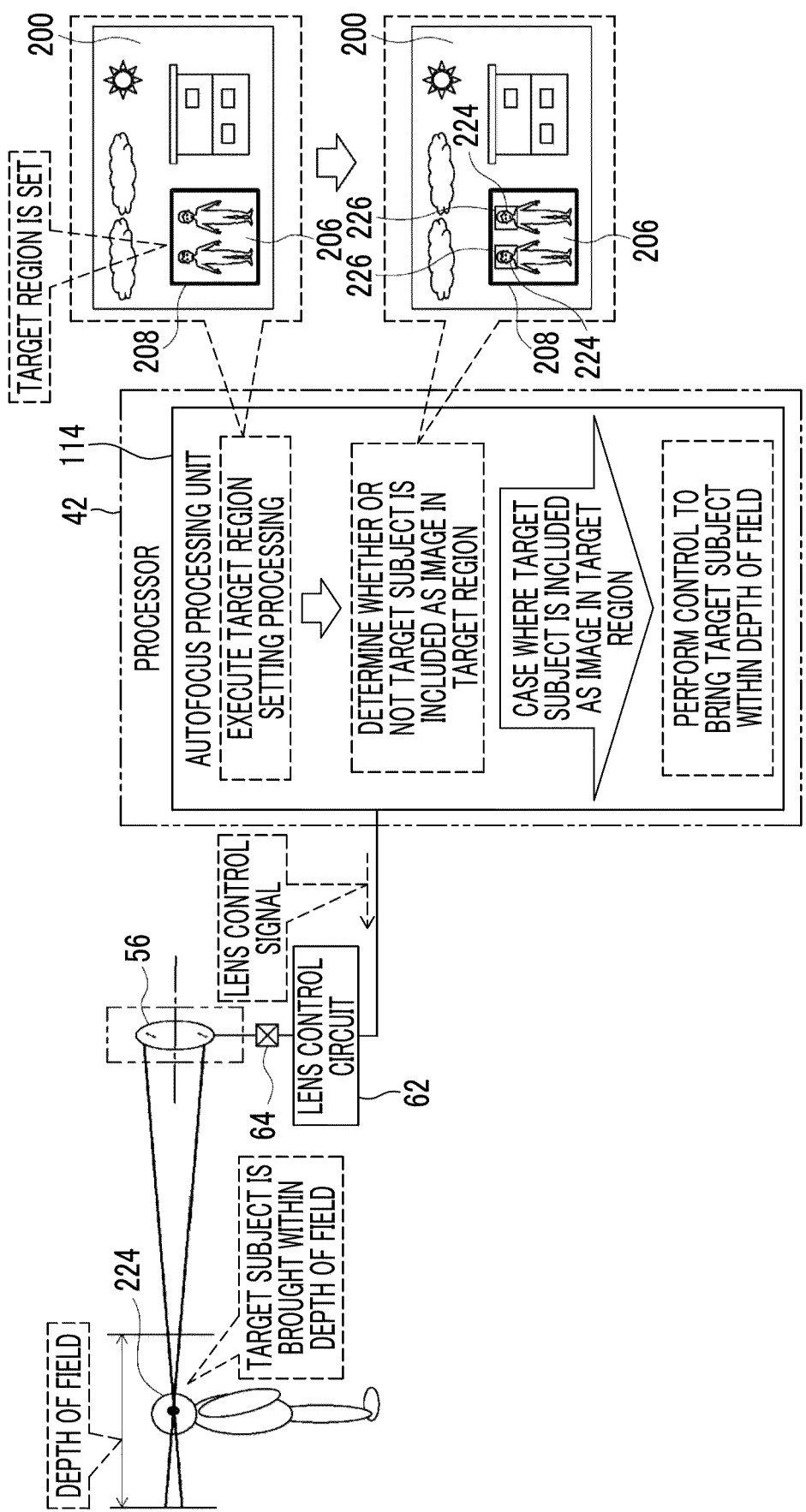
FIG. 30 is an explanatory diagram showing an example of an operation of a processor according to an eighth embodiment.

FIG. 30 shows the eighth embodiment. In the eighth embodiment, the first embodiment is modified as follows.

As shown in FIG. 30 as an example, the processor 42 operates as an autofocus processing unit 114. In a case where a target subject 224 is included as an image in the target region 206 in the captured image 200, the autofocus processing unit 114 performs control to bring the target subject 224 within the depth of field.

Specifically, the autofocus processing unit 114 performs the following processing. That is, first, the autofocus processing unit 114 executes target region setting processing. For example, the target region setting processing according to any one of the first to seventh embodiments described above is applied to the target region setting processing. Accordingly, the target region 206 is set for the captured image 200, and the captured image 200 and the target region frame 208 are displayed on the display 72.

Subsequently, the autofocus processing unit 114 determines whether or not the target subject 224 is included as an image in the target region 206 in the captured image 200.

In this case, for example, the autofocus processing unit 114 determines whether or not the target subject 224 is included as an image in the target region 206, based on the captured image data acquired in the target region setting processing by using an image processing technology such as pattern matching. The target subject 224 refers to a subject to be brought within the depth of field as described below. The target subject 224 is an example of a "target subject" according to the technology of the present disclosure.

In the example shown in FIG. 30, the target subject 224 is a person's face. The target subject 224 may be a face of an animal or a subject other than a face, in addition to a face of a person. Further, in a case of determining that the target subject 224 is included as an image in the target region 206, a detection frame 226 indicating a frame surrounding the target subject 224 may be displayed on the display 72 while being superimposed on the captured image 200.

Then, in a case of determining that the target subject 224 is included as an image in the target region 206, the autofocus processing unit 114 performs the control to bring the target subject 224 within the depth of field. That is, the autofocus processing unit 114 outputs a lens control signal to the lens control circuit 62 to control the first actuator 64 through the lens control circuit 62, thereby adjusting the position of the focus lens 56 to a position where the target subject 224 is brought within the depth of field. In this way, the control to bring the target subject 224 within the depth of field is performed.

Figure 31:
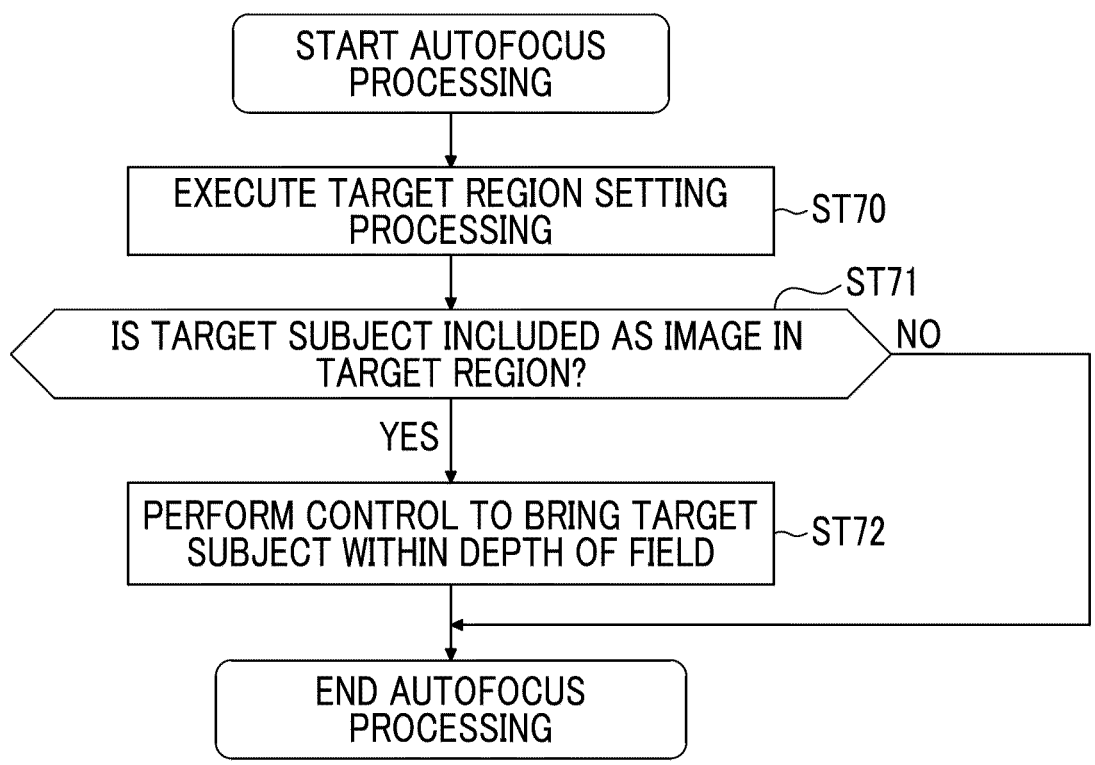
FIG. 31 is a flowchart showing an example of a flow of autofocus processing according to the eighth embodiment.

Next, an action of the imaging apparatus according to the eighth embodiment will be described with reference to FIG. 31. FIG. 31 shows an example of a flow of the autofocus processing according to the eighth embodiment.

In the autofocus processing shown in FIG. 31, first, in step ST70, the autofocus processing unit 114 executes the target region setting processing. Accordingly, the target region 206 is set for the captured image 200, and the captured image 200 and the target region frame 208 are displayed on the display 72.

After the processing of step ST70 is executed, the autofocus processing transitions to step ST71.

In step ST71, the autofocus processing unit 114 determines whether or not the target subject 224 is included as an image in the target region 206 based on the target region data acquired by the target region setting processing executed in step ST70. In a case where the target subject 224 is not included as an image in the target region 206 in step ST71, the determination is negative and the autofocus processing ends. In a case where the target subject 224 is included as an image in the target region 206 in step ST71, the determination is positive and the autofocus processing transitions to step ST72.

In step ST72, the autofocus processing unit 114 performs the control to bring the target subject 224 within the depth of field. Accordingly, the target subject 224 is brought within the depth of field. After the processing of step ST72 is executed, the autofocus processing ends.

As described above, in the eighth embodiment, in a case where the target subject 224 is included as an image in the target region 206, the processor 42 performs control to bring the target subject 224 within the depth of field. Accordingly, for example, in the autofocus processing, the target subject 224 can be brought within the depth of field based on the visual line position.

Although the first to eighth embodiments have been described above, the above-described embodiments and modification examples can be combined with each other as long as no contradiction arises. In a case where the above-described embodiments and modification examples are combined, in a case where there are a plurality of overlapping steps, priorities may be given to the plurality of steps depending on various conditions or the like.

In the above-described embodiments, a digital camera is exemplified as the imaging apparatus 10, but the technology of the present disclosure is not limited thereto, and for example, a terminal device functioning as the imaging apparatus 10 (for example, a tablet terminal, a smart device, or a wearable terminal) may be used. Further, the digital camera serving as the imaging apparatus 10 may be any of various digital cameras such as a compact digital camera, a mirrorless single-lens reflex camera, and a digital single-lens reflex camera. The digital camera may be a lens-interchangeable digital camera or a lens-fixed digital camera. Further, the technology of the present disclosure may be applied to various information processing apparatuses other than the imaging apparatus 10 (for example, a cell observation apparatus, an ophthalmic observation apparatus, a surgical microscope, or the like).

In the above-described embodiments, the visual line position of one eye is detected, but visual line positions of both eyes may be detected.

Further, the processor 42 has been exemplified in each of the above-described embodiments, but at least one other CPU, at least one GPU, and/or at least one TPU may be used instead of the processor 42 or together with the processor 42.

In the above-described embodiment, although an embodiment example in which the program 100 is stored in the NVM 44 has been described, the technology of the present disclosure is not limited thereto. For example, the program 100 may be stored in a portable non-transitory computer-readable storage medium such as an SSD or a USB memory (hereinafter, simply referred to as a "non-transitory storage medium"). The program 100 stored in the non-transitory storage medium is installed on the computer 20 of the imaging apparatus 10, and the processor 42 executes processing according to the program 100.

Further, the program 100 may be stored in a storage device such as another computer or a server device connected to the imaging apparatus 10 through a network, and the program 100 may be downloaded in response to a request from the imaging apparatus 10 and installed in the computer 20.

Further, it is not necessary to store the entire program 100 in a storage device such as another computer or a server device connected to the imaging apparatus 10 or in the NVM 44, and a part of the program 100 may be stored.

Further, although the computer 20 is incorporated in the imaging apparatus 10, the technology of the present disclosure is not limited thereto, and for example, the computer 20 may be provided outside the imaging apparatus 10.

Further, although the computer 20 including the processor 42, the NVM 44, and the RAM 46 is exemplified in each of the above-described embodiments, the technology of the present disclosure is not limited thereto, and a device including at least one of an ASIC, an FPGA, or a PLD may be applied instead of the computer 20. Further, a combination of a hardware configuration and a software configuration may be used instead of the computer 20.

Further, the following various processors can be used as hardware resources for executing various kinds of processing described in each of the above-described embodiments. Examples of the processors include a CPU that is a general-use processor executing software, that is, a program to function as a hardware resource executing various kinds of processing. Further, examples of the processors include a dedicated electrical circuit such as an FPGA, a PLD, or an ASIC that is a processor having a circuit configuration dedicatedly designed to execute a specific type of processing. A memory is incorporated in or connected to any processor, and any processor executes various kinds of processing by using the memory.

The hardware resource executing various kinds of processing may be configured by one of these various processors, or may be configured by a combination of two or more processors of the same type or different types (for example, a combination of a plurality of FPGAs or a combination of a CPU and an FPGA). Further, the hardware resource executing various kinds of processing may be one processor.

As an example in which the hardware resource is configured by one processor, first, there is a form in which one processor is configured by a combination of one or more CPUs and software, and this processor functions as the hardware resource executing various kinds of processing. Second, as represented by SoC or the like, there is a form in which a processor that realizes the functions of the entire system including a plurality of hardware resources executing various kinds of processing with one IC chip is used. As described above, various kinds of processing are realized by using one or more of the various processors described above as hardware resources.

As a hardware structure of these various processors, more specifically, an electrical circuit in which circuit elements such as semiconductor elements are combined can be used. Further, the above-described visual line detection processing is merely an example. Therefore, needless to say, unnecessary steps may be deleted, new steps may be added, or the processing order may be changed without departing from the scope of the present invention.

Above described contents and shown contents are detailed description for parts according to the technology of the present disclosure and are merely one example of the technology of the present disclosure. For example, the above description regarding the configuration, function, action, and effect is a description regarding an example of the configuration, function, action, and effect of the parts according to the technology of the present disclosure. Accordingly, needless to say, unnecessary parts may be deleted, new elements may be added, or replacement may be made with respect to the above described contents and the above shown contents without departing from the scope of the technology of the present disclosure. Further, in order to avoid complication and facilitate understanding of the parts according to the technology of the present disclosure, description related to common technical knowledge or the like that does not need to be particularly described in order to enable implementation of the technology of the present disclosure is omitted in the above described contents and the above shown contents.

In the present specification, "A and/or B" has the same meaning as "at least one of A or B". That is, "A and/or B" means that only A may be used, only B may be used, or a combination of A and B may be used. Further, in the present specification, in a case where three or more matters are expressed by "and/or" in combination, the same concept as "A and/or B" is applied.

All documents, patent applications, and technical standards described in the present specification are herein incorporated by reference to the same extent as if each individual publication, patent application, or technical standard was specifically and individually indicated to be incorporated by reference.

What is claimed is:

1. An information processing apparatus comprising:
a processor,
wherein the processor is configured to:
acquire first image data;
output the first image data to a display;
acquire visual line data;
detect, as a gaze position, a visual line position of a case where a state where a variation distance of the visual line position with respect to a first image indicated by the first image data is equal to or shorter than a first distance continues for a first time or longer based on the visual line data; and set a first region based on two or more gaze positions.

2. The information processing apparatus according to claim 1,
wherein the processor is configured to set, as the first region, a rectangular region having two gaze positions as opposite corners, a circular region having a line connecting the two gaze positions as a diameter, or a closed region defined by connecting a plurality of gaze positions in an order in which the plurality of gaze positions are detected.

3. The information processing apparatus according to claim 1,
wherein the processor is configured to:
in a case where three or more gaze positions are detected, set a position at which lines connecting two gaze positions intersect with each other as an intersection position; and
set the first region based on the gaze positions and the intersection position.

4. The information processing apparatus according to claim 3,
wherein, in a case where the first region having n vertices is set, at least n+1 gaze positions are used.

5. The information processing apparatus according to claim 1,
wherein the processor is configured to:
output data indicating a visual line position mark that specifies the visual line position in the first image until the first time is reached; and
output data indicating a gaze position mark that specifies the gaze position in the first image in a case where the first time is reached.

6. The information processing apparatus according to claim 5,
wherein the visual line position mark changes in form with passage of time.

7. The information processing apparatus according to claim 1,
wherein the processor is configured to set the first region from a plurality of regions included in the first image based on the two or more gaze positions.

8. The information processing apparatus according to claim 1,
wherein the information processing apparatus is an imaging apparatus, and
the processor is configured to perform, in a case where a target subject is included as an image in the first region, control to bring the target subject in a depth of field.

9. An information processing method comprising:
acquiring first image data;
outputting the first image data to a display;
acquiring visual line data;
detecting, as a gaze position, a visual line position of a case where a state where a variation distance of the visual line position with respect to a first image indicated by the first image data is equal to or shorter than a first distance continues for a first time or longer based on the visual line data; and
setting a first region based on two or more gaze positions.

10. A non-transitory computer-readable storage medium storing a program for causing a computer to execute a process comprising:
acquiring first image data;
outputting the first image data to a display;
acquiring visual line data;
detecting, as a gaze position, a visual line position of a case where a state where a variation distance of the visual line position with respect to a first image indicated by the first image data is equal to or shorter than a first distance continues for a first time or longer based on the visual line data; and
setting a first region based on two or more gaze positions.

* * * * *